June 16, 1964  J. V. ATANASOFF ETAL  3,137,390
ARTICLE SORTING MECHANISM PARTICULARLY
FOR THIN ARTICLES SUCH AS LETTERS
Filed Sept. 19, 1960  12 Sheets-Sheet 1
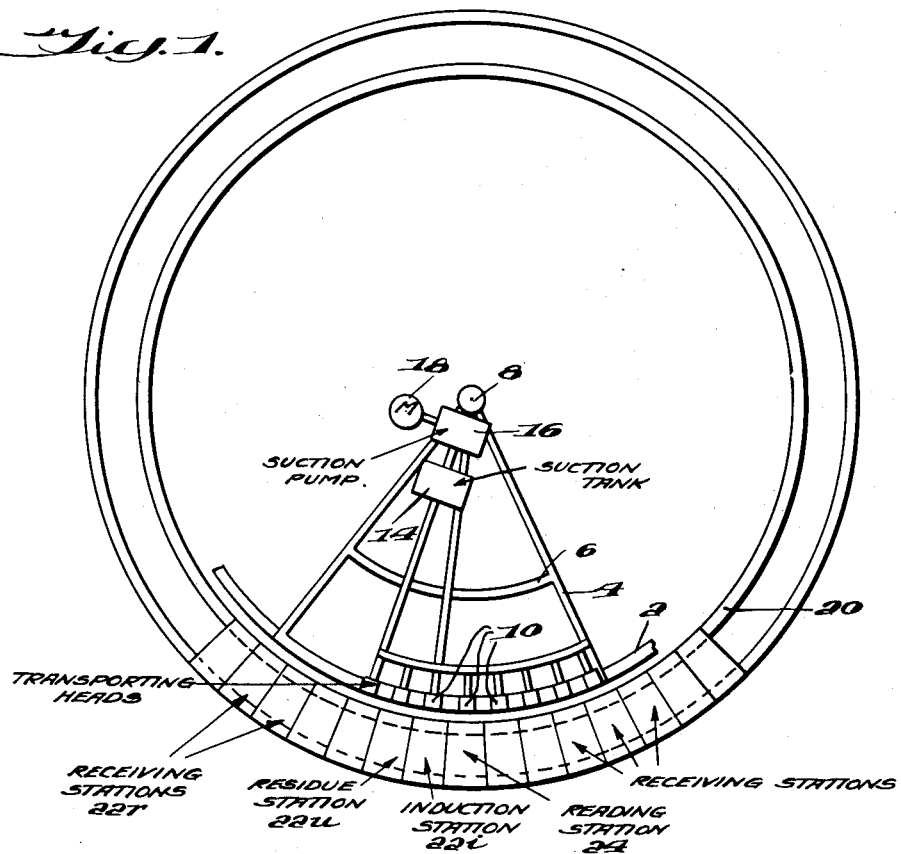
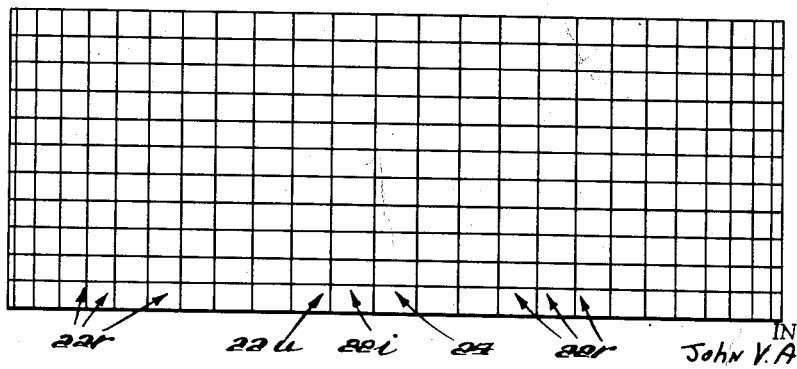
INVENTORS
John V. Atanasoff
Robert C. Gathers
BY Bailey, Stephens & Huettig
ATTORNEYS

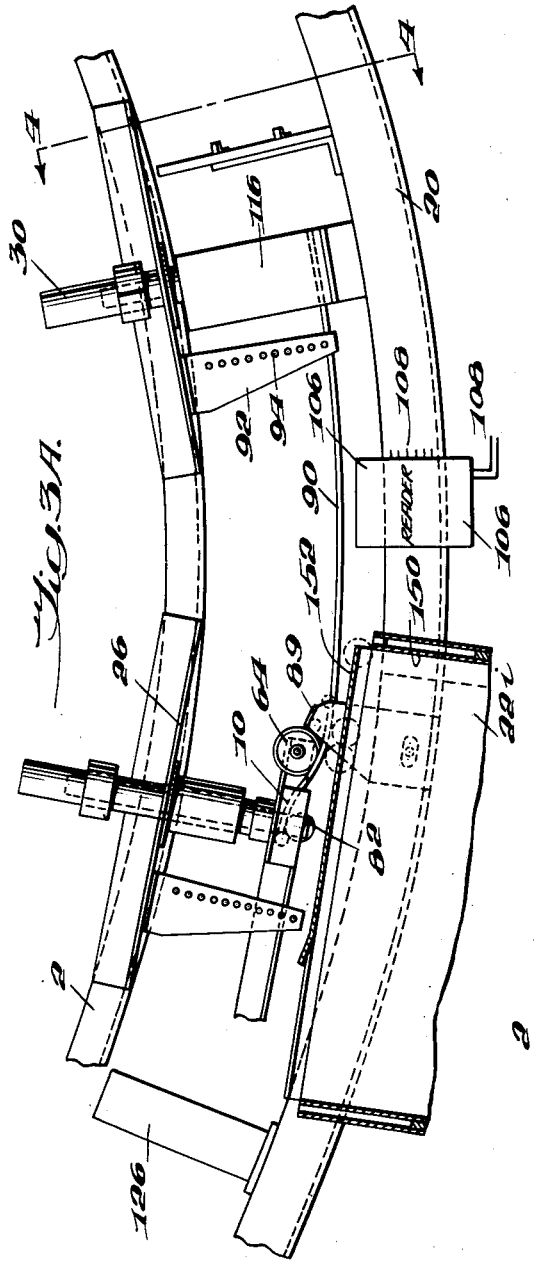

INVENTOR
John V. Atanasoff
Robert C. Gathers

BY Bailey, Stephens & Huettig
ATTORNEYS

June 16, 1964   J. V. ATANASOFF ETAL   3,137,390
ARTICLE SORTING MECHANISM PARTICULARLY
FOR THIN ARTICLES SUCH AS LETTERS
Filed Sept. 19, 1960   12 Sheets-Sheet 4
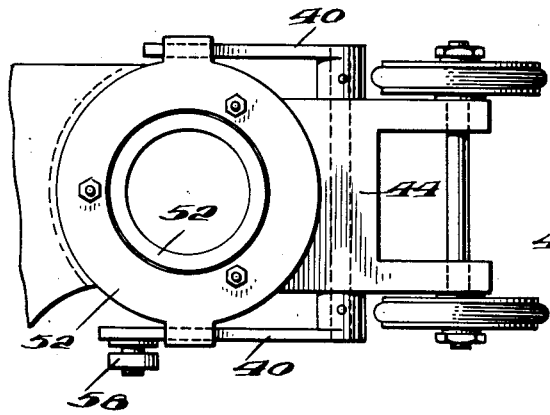
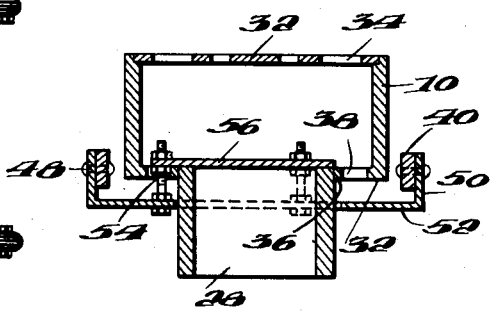
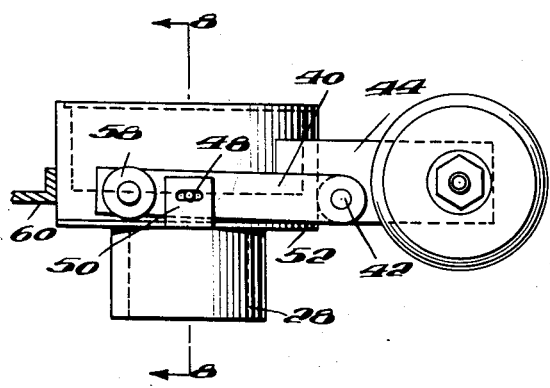
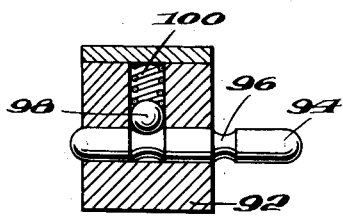
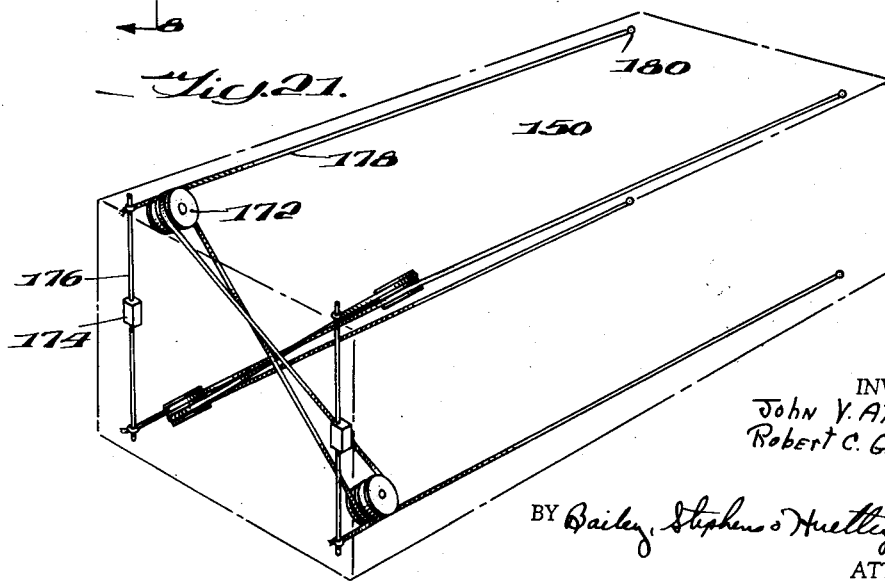
INVENTOR
John V. Atanasoff
Robert C. Gathers
BY Bailey, Stephens & Huettig
ATTORNEYS

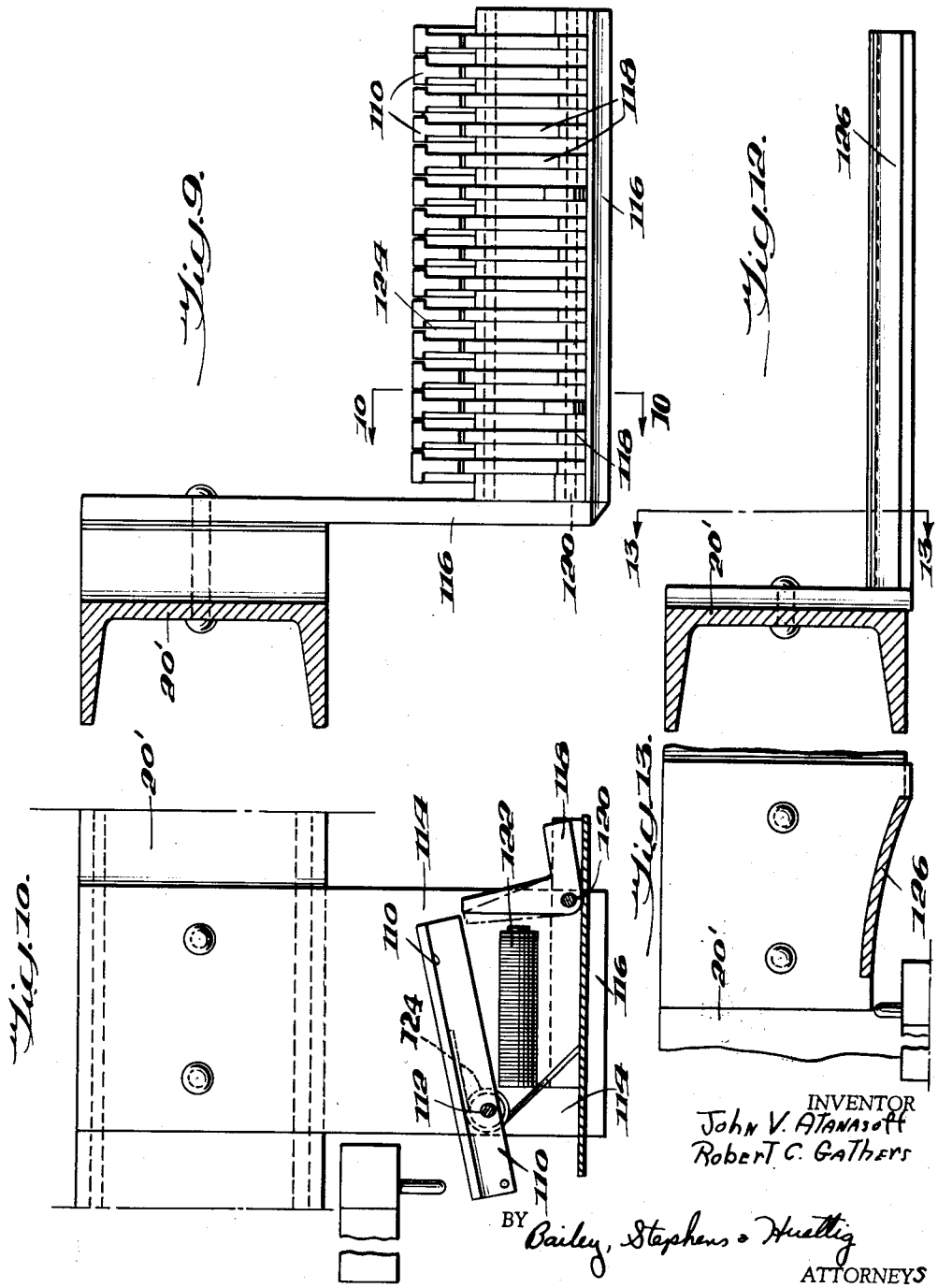

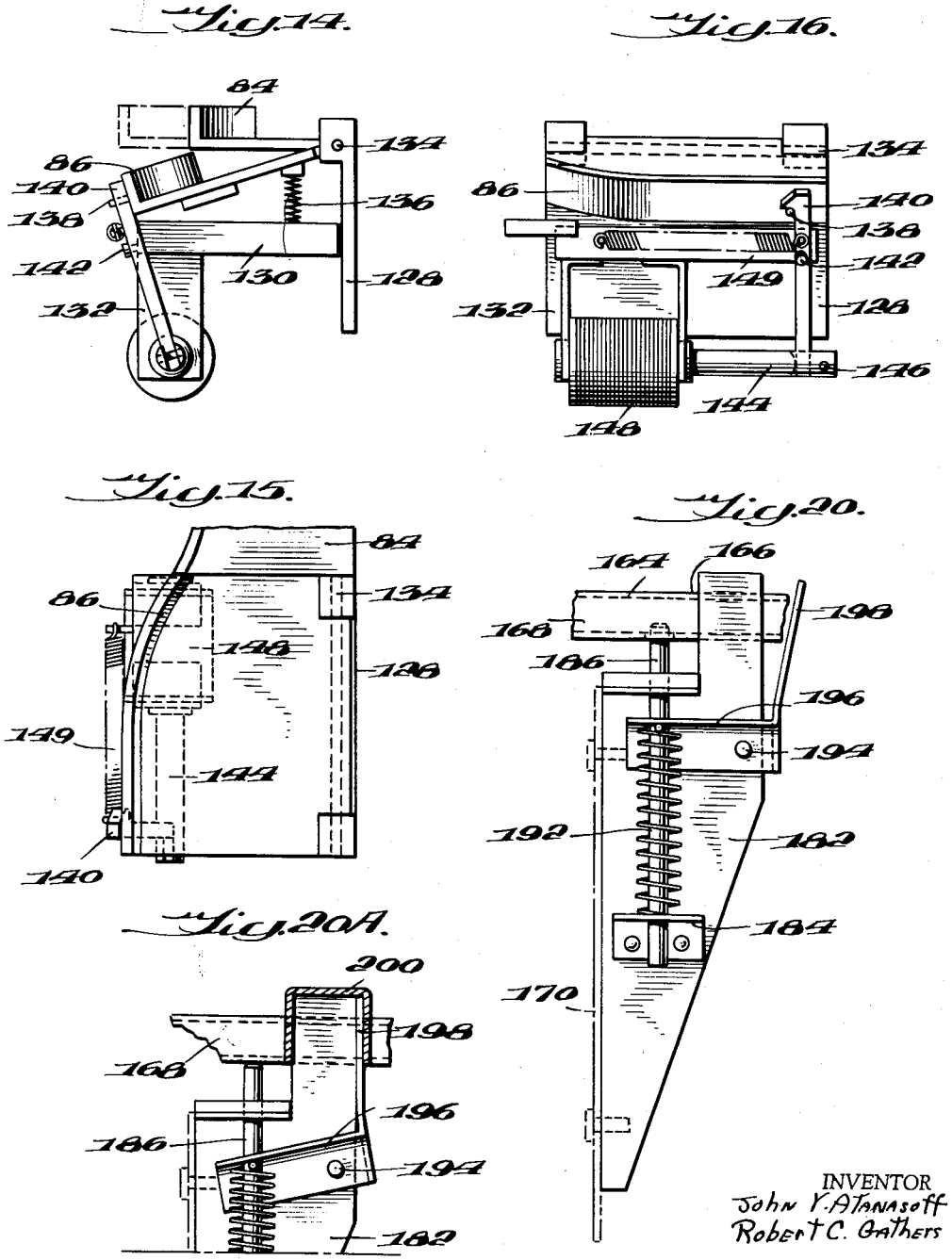

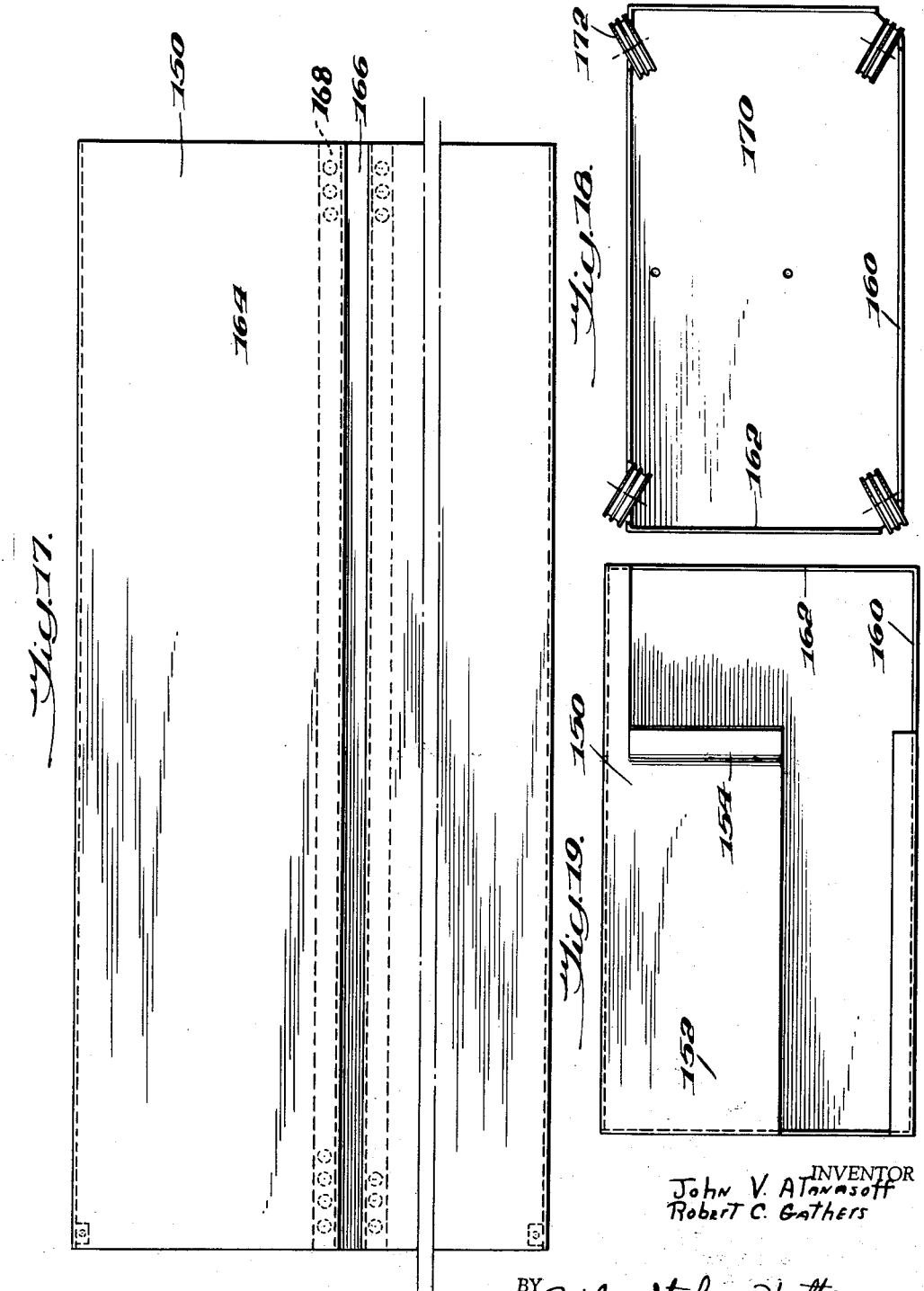

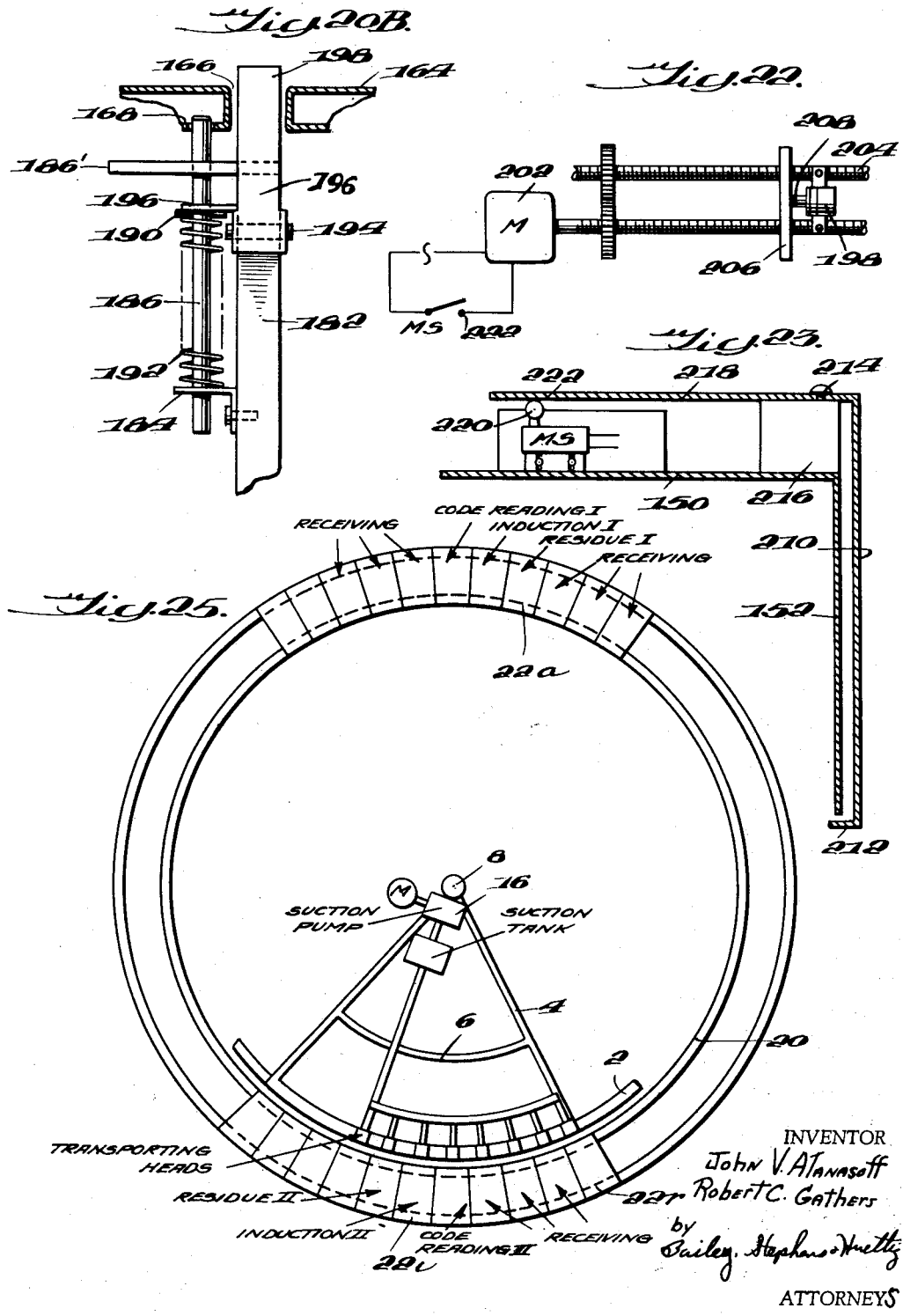

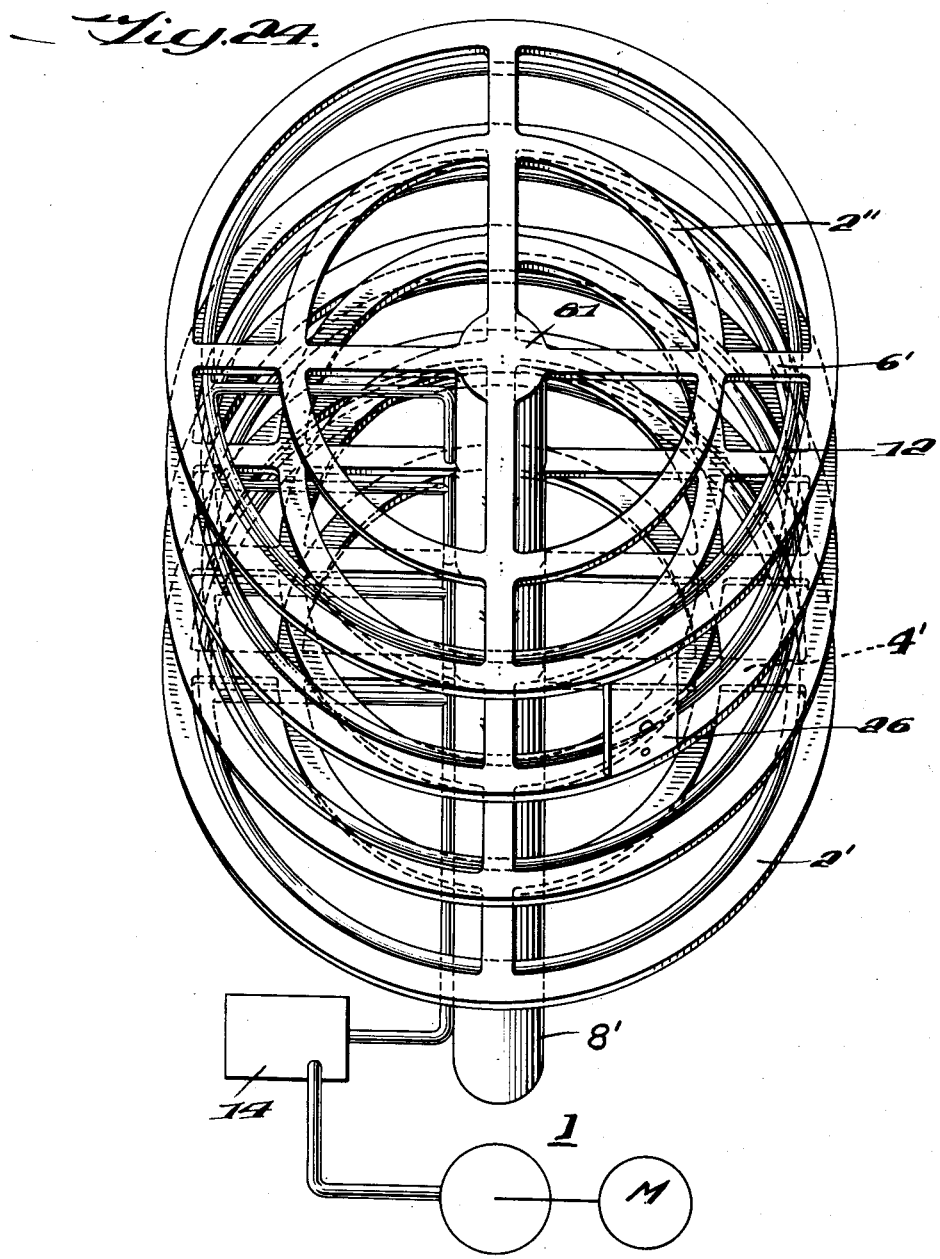

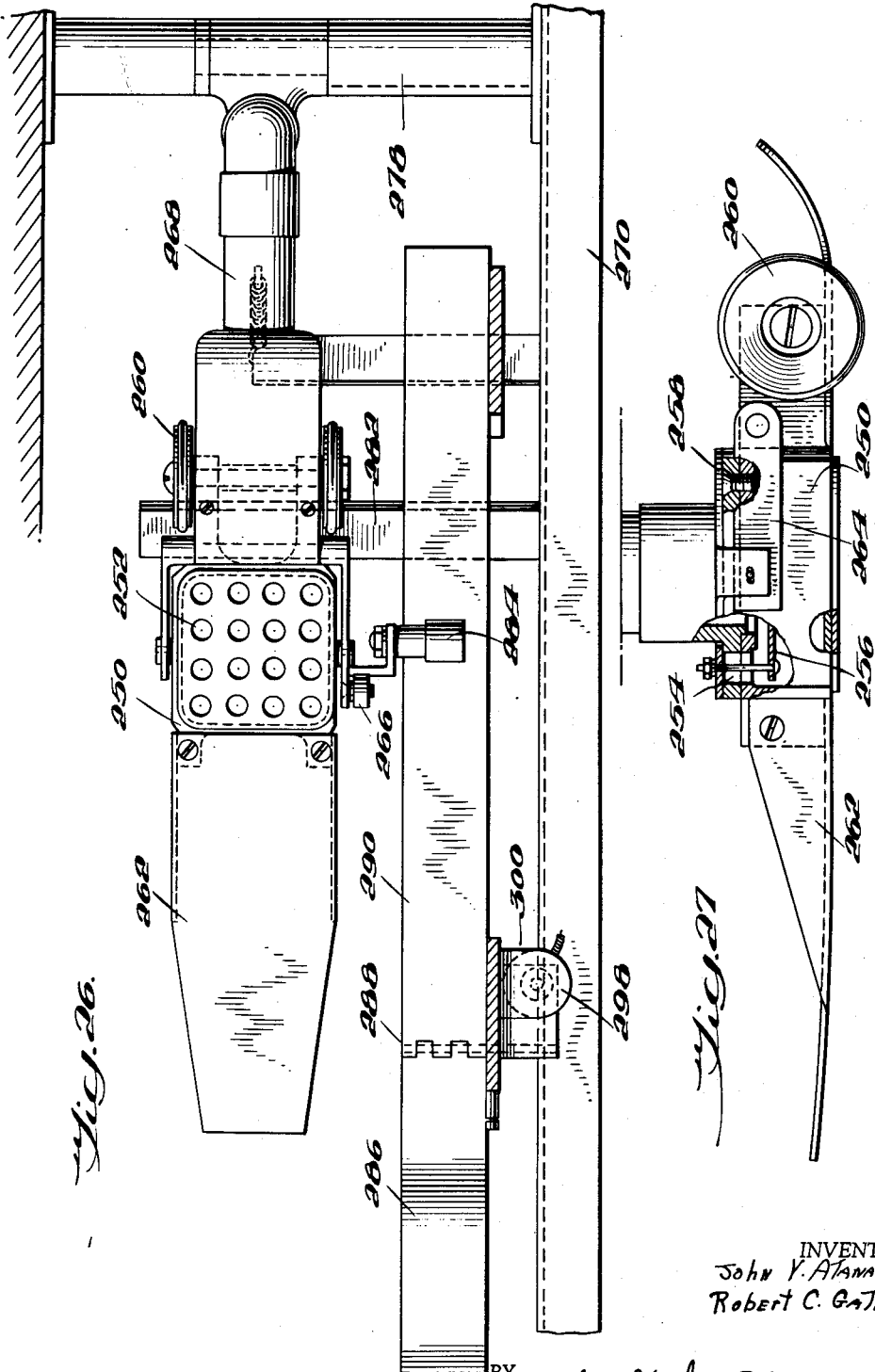

June 16, 1964 J. V. ATANASOFF ETAL 3,137,390
ARTICLE SORTING MECHANISM PARTICULARLY
FOR THIN ARTICLES SUCH AS LETTERS
Filed Sept. 19, 1960 12 Sheets-Sheet 11
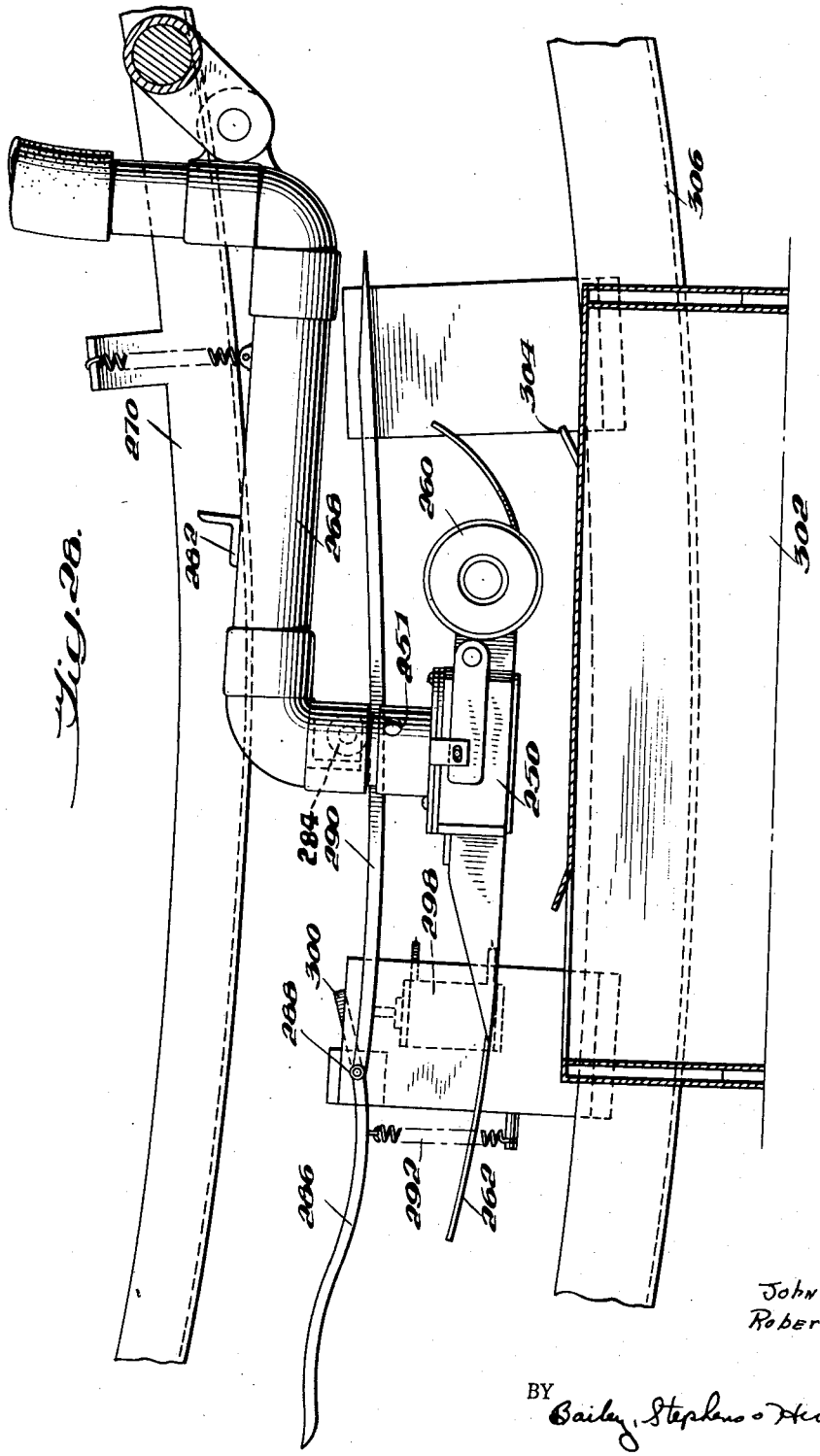
INVENTOR
John V. Atanasoff
Robert C. Gathers
BY Bailey, Stephens & Huettig
ATTORNEYS

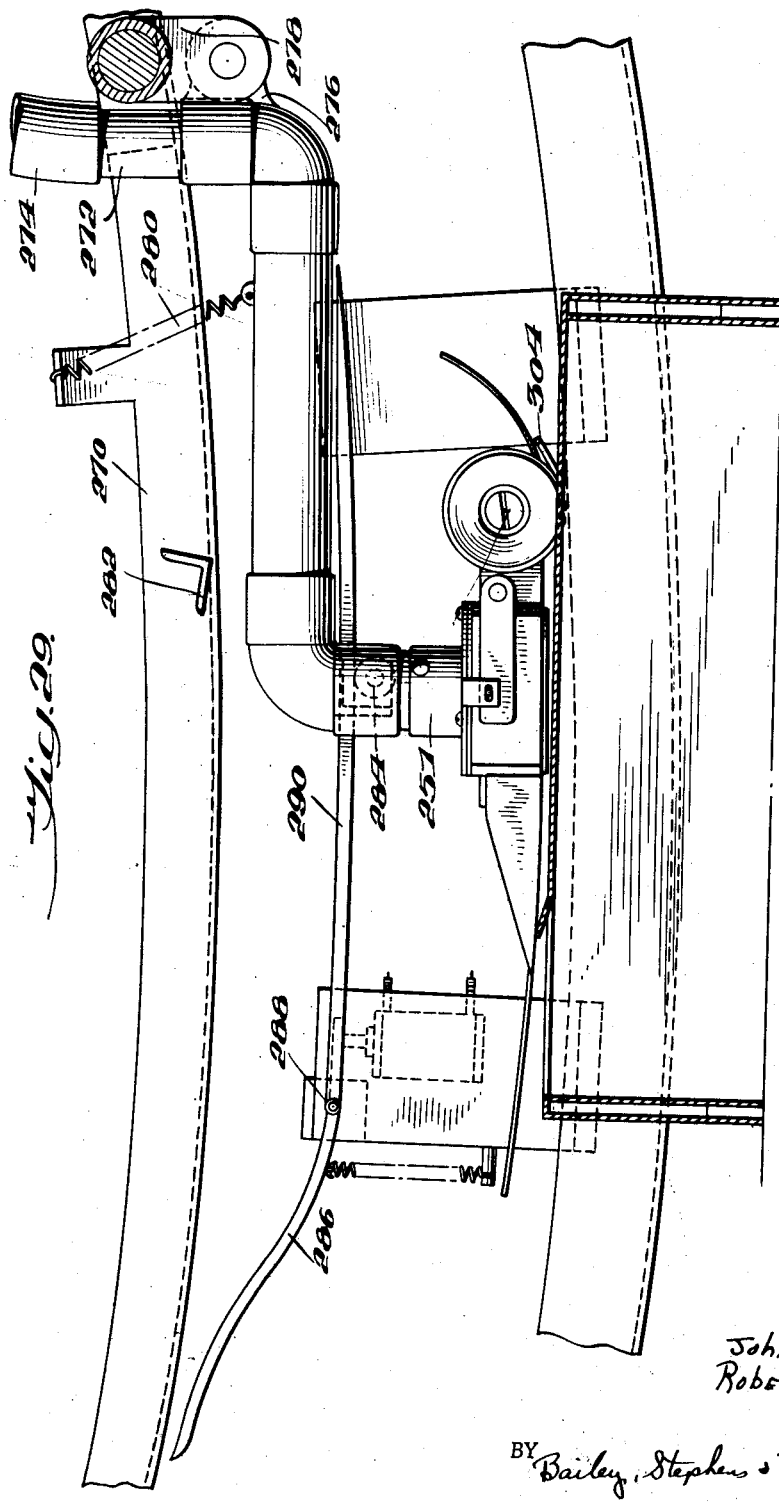

United States Patent Office 3,137,390
Patented June 16, 1964

3,137,390
ARTICLE SORTING MECHANISM PARTICULARLY
FOR THIN ARTICLES SUCH AS LETTERS
John V. Atanasoff and Robert C. Gathers, Frederick, Md.,
assignors to Aerojet-General Corporation, Azusa,
Calif., a corporation of Ohio
Filed Sept. 19, 1960, Ser. No. 56,962
50 Claims. (Cl. 209—72)

The invention relates to apparatus for sorting articles, especially thin articles such as letters or the like, as well as to certain parts thereof.

Various machines for sorting letters or the like, especially for use in post offices, have been heretofore proposed. However, none of these has proven entirely satisfactory. Most of them require a very large amount of floor space. Likewise, in many of them, substantial parts of the equipment are not operated at more than a small fraction of their capacity.

The primary object of the present invention is to provide a machine for sorting letters or the like which has a large capacity, but which occupies comparatively little floor space.

Another object of the invention is to provide a machine in which the various parts are used to a substantial proportion of their full capacity at all times.

Still another object of the invention is to provide a system in which the letters are handled in trays or drawers at all times, as many as 500 at a time, so that handling is substantially reduced.

A further object of the invention is to provide a mechanical memory system of great simplicity for a device of this type.

An additional object of the invention is to provide an especially efficient type of tray for use in such a system.

It is also an object of the invention to provide a sorting mechanism in which faulty parts can be repaired or replaced while the machine is in operation, thus reducing shutdown time.

Still a further object of the invention is to provide a normal type of pickup device or sucker unit, in which the suction is cut off completely at all times except when the device is picking up or releasing a letter, so that there is a very small loss of suction and the power required is substantially reduced.

In general, the system includes a rotating carrier for the pickup members, around which is framework, providing a series of stations, at least one of which is an induction station where letters are picked up by the carrier, and a large number of which are receiving stations. There is also at least one code reading station and at least one residue station. At each station are holders for trays or drawers, for holding letters or the like which are to be sorted. A substantial number of annular rows of tray stations and pickup members are arranged one above the other.

The pickup members are mounted on the carrier for radial movement towards and from the framework. Cams are provided at each station for producing outward radial movement of the pickup member towards the frame.

The letters, before being placed in the induction tray, are suitably coded, as by imprinting code symbols on them in fluorescent ink. The cam at the induction station (at least in the simplest form of the invention, in which only a single pickup member is used) is fixed, and acts to pull the pickup member against the exposed letter at the front of the tray. Another cam at this point actuates the valve of the pickup member to connect the interior of the pickup head to a vacuum source, so that the pickup will take hold of the foremost letter and remove it from the tray as the pickup member moves circumferentially with the rotating carrier.

The pickup member, after it leaves the induction station, then passes a code reading station where the code imprinted on the letter is read by a suitable device, which sets a mechanical memory device associated with the pickup head to store in such device a code signal corresponding to the code imprinted on the letter. The pickup member is then released from the cam and retracted radially inwardly by a spring.

At each receiving station, there is a movable cam section. This cam section is controlled by a code pickup device controlled by a preselected signal set on the mechanical memory device. If the proper signal is received, the cam section is moved to active position, and the pickup member is then drawn radially outward so that it deposits a letter in the tray of the selected station. At the same time, a second cam actuates the valve in the receiving head to shut off the suction, this suction remaining shut off until the pickup is again drawn outwardly at an induction station.

The station immediately preceding the induction station is a residue station, at which any letters not deposited in preselected receiving stations will be discharged by the pickup head.

Further objects and advantages of the invention will appear more fully from the following description, especially when taken in conjunction with the accompanying drawings which form a part thereof.

In the drawings:

FIG. 1 shows somewhat schematically, in plan view, an apparatus embodying the invention;

FIG. 2 is a side view thereof;

FIGS. 3A and 3B show on an enlarged scale a part of the mechanism of FIG. 1;

FIG. 6 is a rear view of the pickup member shown in FIG. 5;

FIG. 7 is a top plan view of the pickup member shown in FIG. 5;

FIG. 8 is a cross-section on the line 8—8 of FIG. 7;

FIG. 9 is a side view of the pin setting mechanism of the mechanical memory device;

FIG. 10 is a side view, partly in section on the line 10—10 of FIG. 9;

FIG. 11 is a cross-section taken along the line 11—11 of FIG. 4 through the mechanical memory device;

FIGS. 12 and 13 show, in side elevation and in cross-section on the line 13—13 of FIG. 12 respectively, the pin resetting device;

FIG. 14 is an end view of the track cam operating mechanism;

FIG. 15 is a top plan view of the track cam operating mechanism shown in FIG. 14; and FIG. 16 is a side view of the track cam operating mechanism shown in FIG. 14; and FIG. 17 is a plan view of a tray embodying the invention;

FIG. 18 is a rear view of the tray shown in FIG. 17;

FIG. 19 is a front view of the tray;

FIG. 20 is a side view of the locking mechanism;

FIG. 20A is a view of a part of FIG. 20 showing this mechanism when used in a receiving tray;

FIG. 20B is an end view of the device of FIG. 20;

FIG. 21 is a perspective view of the tray;

FIG. 22 is a schematic view showing the plate advancing mechanism for the induction tray;

FIG. 23 is a partially schematic cross-sectional view showing the pressure control mechanism associated with the induction tray;

FIG. 24 shows in perspective a rotatable carrier for the transporting members;

FIG. 25 is a somewhat schematic plan view of a modified apparatus in accordance with the present invention;

FIG. 26 shows in side elevation a modified form of pickup head;

FIG. 27 is a plan view of the modified form of pickup head shown in FIG. 26; and FIGS. 28 and 29 show in plan view two positions of the modified pickup head shown in FIG. 26 with the means for moving it at a delivery station.

Figure 4:
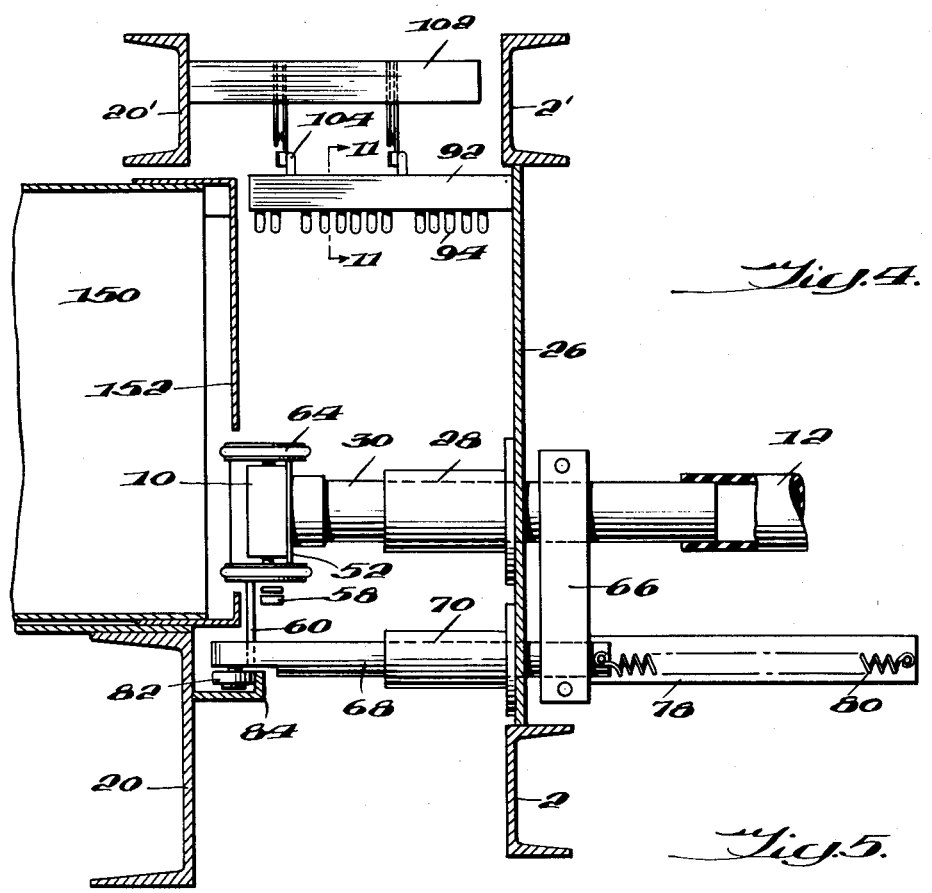
FIG. 4 is a cross-section on the line 4—4 of FIG. 3A.
Figure 5:
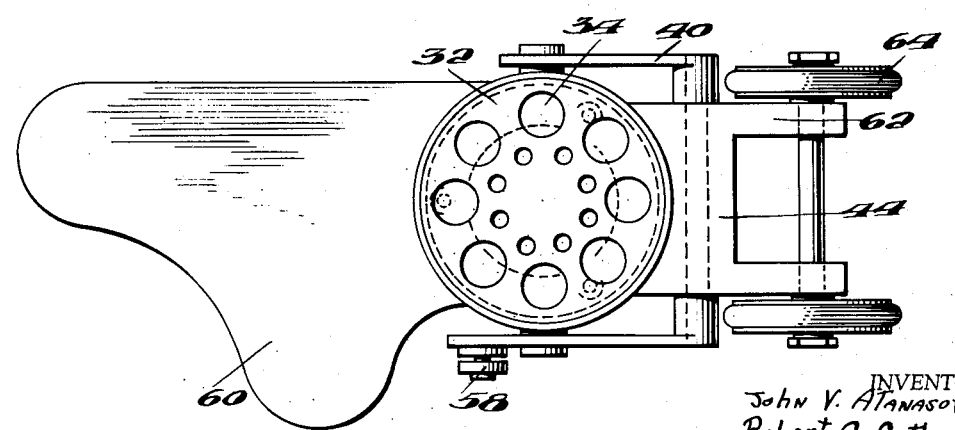
FIG. 5 is a front view of the pickup member, from the left hand side of FIG. 4.

Referring first to FIGS. 1 and 2, there is shown a carrier composed of outer rings 2 with radial ribs 4, frame members 6 and the like mounted for rotation on a vertical shaft 8 as by a motor or the like (not shown). Mounted on ring 2 are pickup members or transporting heads 10 (see FIGS. 3A, 3B to 8), connected by pipes or hoses 12 to a suitable suction tank 14 carried by the carrier and automatically maintained at a predetermined sub-atmospheric pressure, say one to two p.s.i., below atmospheric, by a pump 16 driven by motor 18.

A stationary framework of rings 20 surrounds the carrier at a small distance from it. This framework contains seats for trays 22i at the induction stations, 22r at the receiving stations, and 22u at the residue station. The station 24 to the right of the induction station is left blank to permit the code reading and mechanical memory setting mechanism to operate at this point.

FIG. 2 shows a number of such tray assemblies mounted one above the other, each horizontal ring of trays having an annular set of pickups cooperating with it.

With such an arrangement, it is possible to divide letters or the like in one level of trays into a number of different groups, which then later are themselves further subdivided in another series of trays. It is thus possible to obtain full use or substantially full use of the trays in such an assembly, since, for example, if all letters addressed to a group of destinations, as cities in a given state, are sorted into one of the primary trays, this tray can then be placed as an induction tray in another group of trays, and the letters can there be separated further. This latter level of trays can be used for a number of different groups of destinations in succession, and neither it nor the main assorting assembly need stand idle.

Referring now to FIGS. 3A to 8, one of the annular rings 2 and one of the stationary outer rings 20 are shown. Actually, as shown in FIG. 4, each level includes also an upper ring 2' which is a part of the rotating frame and an upper stationary ring 20'.

Mounted on a plate 26 positioned between and secured to the rings or rails 2, 2' is a tubular guide 28 in which is slidable a pipe section 30. The inner end of this pipe section is connected by the hose 12 to the suction pipe 14. On the outer end of the pipe section 30 is the transporting head 10.

The transporting head 10 (see FIGS. 5 to 8) consists of a cylindrical body having a front wall 32 provided with a plurality of openings 34 and a rear wall 36 which is secured on the pipe 28. This rear wall has openings 38 therein around the outside of the pipe 28.

A pair of levers 40 are pivoted at 42 on a projection 44 on the side of the head 10. On these levers is loosely pivoted, by pins 48 engaging in slots in lugs 50, an annular ring member 52, positioned so that it can, when moved upwardly in FIG. 8, overlie the openings 38. Rigidly connected with the ring 52 by bolts 54 is a second plate 56 capable of overlying the open end of the pipe section 28.

One of the levers 42 also carries an actuating roller 58.

Head 10 has a rearward extension consisting of a plate with an enlarged surface, indicated at 60, and likewise a forward extension 62 on which are pivotally mounted wheels 64. The portion 60 projects downwardly below the operating head, for purposes to be explained hereinafter.

A bracket 66 rigidly connects pipe 30 to a rod 68 slidable in a guide sleeve 70 likewise carried by plate 26.

At its outer end, the bar 68 carries a roller 82. A spring 80 is connected between cross-piece 60 and projection 78 and urges the suction head to its radially inward position.

The stationary ring 20 carries a series of cam tracks 84. The cam track at each receiving station has at the end facing the oncoming suction head a movable section 86, which extends radially inwardly (that is, towards the central axis of rotation) further than the main section 84. The operation of these sections will be described hereinafter. Likewise, at each receiving station, there is a cam 88 which is within the path of the roller 58 when the pickup member is in the radially outward position as shown at the right in FIG. 3B.

At the induction station, which is shown in FIG. 3A, at the left, there is in the modification shown herein a fixed cam track 90.

Likewise mounted on each plate 26 is a radially extending block 92 in which are mounted a plurality of pins 94. As shown in FIG. 11, each pin 94 has two grooves 96 therein, and a bore in the block 92 transverse to the bore in which the pin 94 is slidable encloses a ball 98 pressed by spring 100 into engagement with one or the other of grooves 96, so that the pins can be held either in upward or downward position (see FIG. 4).

At a suitable distance in front of each receiving station there is a transverse bar 102, on which are mounted two microswitches arranged at different radial distances from the central axis of rotation, so that the setting of two pins on the block 92 will engage the microswitches 104 at only a single receiving station.

Just beyond the induction station is a code reader 106, which reads the code imposed on each letter and through its output lines 108 controls a mechanism for setting the pins 94. This mechanism, shown in FIGS. 9 and 10, includes a plurality of levers 110 pivoted at 112 on upwardly extending frame members 114 carried by a frame 116 mounted on rail 20' and extending somewhat below it. Frame 116 also carries a plurality of bell crank levers 118 pivoted at 120, there being one bell crank lever for each lever 110. There are also a plurality of solenoids 122, which when energized can move the levers 118 from the solid line position shown in FIG. 10 to the broken line position.

The reader 106 energizes two of the solenoids 122, and draws the corresponding levers of the setting mechanism to the broken line position shown in FIG. 10, so that two of the levers 110 are blocked from downward movement at their right hand ends (FIG. 10).

As the various pins 94 pass over the group of levers shown in FIG. 9, they will merely depress these levers, which are only lightly held in raised position by springs 124, unless the downward movement of the lever 110 is blocked by lever 118, in which case two pins which engage these levers will be raised to the position shown in FIG. 4.

Just in front of the induction station is a cam member 126, which is mounted on rail 20', and which extends across the whole width of the blocks 92. As shown in FIG. 13, any pins which are raised as they approach the cam surface 126 will be depressed to their lowest positions, so that they can be reset by the reader 106 on the next round.

FIGS. 14 to 16 show the operating mechanism for the movable cam track sections 86. This includes a part 128 fixed on the rail 20, having a lateral extension 130 and a downward extension 132. The movable cam track section 86 is pivoted at 134 on member 128, and is spring pressed upwardly by a coil compression spring 136. Part 86 has a pin 138 which is engageable by a catch 140 pivoted at 142 on lateral extension 130, and having its free end engaged in a slot in a bar 144, from which it is prevented from escaping by pin 146. Bar 144 is the movable member of a solenoid 148. A spring 149 urges catch 140 to locking position.

Assume now that there is a box 150 at the induction station for those letters, and that these letters are pressed against the front wall 152 of the box, which, as is shown in FIG. 4, extends only part way down the front of the box, so as to leave a horizontal gap within which the pickup head can operate, and that the pickup head shown at the left in FIG. 3A is approaching the induction station. Under these circumstances, roller 82 on rod 68 catches in the fixed cam section 90 at the outer end, and moves radially outwardly, or downwardly in FIG. 3A, drawing the pipe 30 and the suction head into engagement with the outermost letter in the box 150. The wheels 64 are sufficiently in front of the suction head 10 so that they have passed by the letters before the suction head 10 is moved into engagement with the outermost letter. Wheel 58 on the suction head valve member engages a cam surface 89, which moves it radially outwardly, and shifts the plates 52 and 56 from the position shown in FIG. 8 to the upward position in that figure, in which plate 52 closes holes 38 and plate 56 moves away from the opening of pipe 28 and opens that pipe, so that suction is applied to the openings 34 in the front wall 32 which is now in engagement with the face of the outermost letter. The suction head therefore picks up the letter, and moves it circumferentially with the suction head.

As the suction head passes the reader 106, the pin setting mechanism 116 (FIGS. 9 and 10) will be set so as to block two of the levers 110. As the block 92 moves over these, the selected pins 94 will be pushed upwardly, thereby setting the mechanism to actuate a selected receiving station.

It is to be noted in FIG. 3A that the suction head and its parts are omitted at the right hand station, so that the parts 116 can be seen.

Now, as block 92 passes each on the bars 102, it will actuate microswitches 104 on one particular bar 102, depending on the presetting of the pins 94. The closing of two switches 104 closes a circuit through the solenoid 148 of the movable cam track section operating mechanism at the next succeeding station. FIG. 3B shows at the left the condition where the station has not been selected, so that cam track section 86 remains lowered and the transporting head remains in its radially inward position. The right hand side of FIG. 3B shows the condition when a selected station is reached, and cam track section 86 is raised. The roller 82 is then engaged by the cam track section and draws the pipe 30 and the pickup head radially outwardly. In this position, the wheels 64 engage the outermost letter in the receiving box 150, and push it inwardly somewhat so as to make a space for the incoming letter which engages behind the front wall 152 of the box. The box has an outwardly sloping edge 154 along the incoming side of wall 152 to facilitate the entry of a letter into the box back of wall 152. Now as the transporting head continues to move past the box at the receiving station, the roller 58 engages the cam member 88, which moves the roller inwardly towards the axis of rotation and shifts the valve member of the suction head back to the position shown in FIG. 8. In this position, the open end of pipe 28 is closed and holes 38 are open, so that the suction within the head 10 is released and the grip on the letter is likewise released. At the same time, there is practically no loss of air since the suction pipe 28 is immediately shut off.

After the roller 82 has engaged the fixed cam track section 84, the downward projection 60 of the suction head engages the movable cam track section and moves it downwardly until catch 140 engages pin 138, thus holding the section in inoperative position until it is again released by solenoid 148.

The residue station has a fixed cam similar to that at the induction station, except that it has a cam 88 for engagement with the wheel 58, instead of a cam 89. In this way, any letters which have not been discharged at any of the receiving stations will be discharged into the box at the residue station.

In the case where two induction stations are used at a single level, as well as two residue stations and two reading stations, the cam tracks at the residue and induction stations must likewise have movable sections. These will be controlled in such a way that, assuming induction stations at the top and bottom of FIG. 1, a transporting head passing the bottom induction station will not raise the movable cam track section at the upper induction station if it is still carrying a letter destined for the left hand side receiving stations. Likewise, the transporting head which has picked up the letter at the upper induction station will not actuate the movable cam track section at the lower induction station if it is carrying a letter destined for the right hand side. Likewise, the residue station at the top will not be actuated to receive a letter from an induction head which has picked up a letter from the bottom, nor will the residue station at the bottom be actuated to receive a letter picked up by the inducted station at the top.

Also, the clearing members 126 must be so arranged that they will clear only the pins 94 of a transporting head member which has made the full circuit of the mechanism.

Such a system is indicated diagrammatically in FIG. 25.

FIGS. 17 to 21 show the trays, these being the same both for the induction station and for the receiving and residue stations.

Each tray has a bottom wall 160, side walls 162 and a top wall 164, the top wall having a central longitudinal slot 166 with downwardly and inwardly turned edges 168. A pressure plate 170 is mounted to slide within the box from back to front or vice versa. Mounted on each corner of the plate 170 is a pulley 172 (FIG. 18), these pulleys having a diagonal position as shown in FIG. 18. Each of these is a double pulley. Near the back of the box on each side wall is a holder 174, which has extending from it rods 176 formed of spring metal. Cables 178 are each connected at one end to an end of one of the springs 176, then extend underneath one of the pulleys 172, for example at the lower left hand corner, then diagonally across the back of plate 170, over the pulley at the upper right hand corner and then forward to a point 180 near the front of the box where it is secured. The four cables so arranged guide the plate very accurately for movement back and forth for maintaining it in an almost exact vertical position.

Carried on the back of each of the plates 170 is a latch mechanism shown in FIGS. 20 and 20B. This includes a block 182 which is mounted on the back of the plate 170, and which has a lateral extension 184. A pin 186 is guided for vertical sliding movement in extension 184 of block 182. A cross pin 190 extends through pin 186, and engages a coil spring 192 surrounding that pin and resting on the projecting member 184.

Pivoted at 194 on the block 182 is a lever 196 of generally bell crank shape, having an actuating portion 198. Pin 186 passes through an opening in lever 196, which overlies the cross pin 190 in pin 186. Pin 186 in its raised position is capable of entering openings within the inturned part 168 of the top wall of the tray.

When this device is used on a receiving tray, where the letters are being pushed into the tray from the front so that the plate 170 is moved backward in the tray, the locking mechanism is rendered inoperative by slipping a clip 200 (see FIG. 20A) over the top of block 182 and the handle portion 198 of the lever 196 so that the pin 186 is held in depressed or unlocking position.

On the other hand, as shown in FIGS. 22 and 23, when the tray is used at an induction station, a motor 202 is provided which drives two parallel threaded shafts 204 on which is threaded a block 206 having a forward projection 208 engageable with the actuating portion 198 of lever 196. As long as the motor runs the member 206 is moved forward, and first engages and releases lever 196 after which it pushes the block 182 and therewith the plate 170 forward to maintain a predetermined pressure on the letters in the induction tray.

This pressure on the letters is kept substantially constant by means of the arrangement shown in FIG. 23. An angle lever or plate 210 having an inwardly directed lower edge 212 just below the lower edge of wall portion 152 is mounted by a loose rivet connection at 214 on an upward projection 216 of box 150, so that it can rock slightly. The horizontal leg 218 of this lever engages the control button 222 of a microswitch 220 likewise mounted on the box 150. This microswitch 220 is connected in the circuit of the motor 202, and is so arranged that the motor is disconnected whenever the actuating member 222 is depressed to a sufficient degree.

Of course, there is a spring in the microswitch 220 tending to push the member 222 upward. This will maintain a certain pressure against lever arm 218 and thereby against the inward projection 212 which will engage the foremost letter in the box. If the pressure on the part 212 becomes greater than that for which the device is set, arm 218 will depress the member 222 sufficiently to open the microswitch 220, thus stopping the operation of the motor. As soon as enough letters have been removed to let the pressure return to the desired value, or slightly below that value, microswitch 220 will again close and motor 202 will move a block 206 forward to feed letters to the front of the box and maintain the proper pressure thereon.

In FIG. 24, a rotary carrier for plates 26 is shown. This has a base 1, on which are mounted the suction mechanism, and a plurality of horizontal rings 2' between which are mounted plates 26. Rings 2' are supported from shaft 8' by ribs 4', and within the outer rings are smaller rings 2'' secured to ribs 6'. Hoses 12 are provided at each level for connecting the suction heads to the suction tank.

The spacing of the parts is such that a repair operator can move between the rings 2' and 2'', using ribs 6' or the rings as a ladder, and can thus reach all parts of the arrangement while riding around with the carrier. Thus repairs can be made without shutdown because of the crawl space provided within the rotating carrier.

The suction head of FIGS. 26 to 29 is generally similar to that of FIGS. 5 to 8, having a closed body portion 250 (of rectangular cross-section) mounted on pipe section 251 with front openings 252 and rear openings 254, a valve plate 256 which can close the end of the suction pipe and a valve ring 258 connected to it for closing the rear openings. It also has outwardly projecting advance rollers 260 and a tail section 262. Valve elements 256 and 258 are connected to levers 264, which carry roller 266.

Pipe 251 has a right-angled section 268 which is generally tangential to the rotating ring 270. Pipe 251 has a second section 272 to which suction hose 274 is attached and a projection 276 which is pivoted on a bracket 278 carried by ring 270. A spring 280 pulls the head towards its radially inward position where it engages stop post 282.

The head also carries a roller 284 engageable with a movable cam track section 286 when this latter section is in operative position, the cam track section being shown in solid lines in FIG. 28. Movable section 286 is pivoted on a vertical axis 288 and forms a continuation of stationary track section 290. It is urged to its inoperative position by spring 292, as depicted in FIG. 29.

When one of the present memory pins engages the actuator of a switch which is in circuit with a solenoid 298, connected to an arm 300 of movable cam track section 286, this is moved to operative position shown in FIG. 29 so as to engage the roller 284 and move the head outwards so as to deposit a letter in box 302. At the end of its travel past the box, the roller 266 engages a stationary cam member 304 which shifts valve members 256, 258 so as to release the letter.

The circuit for the solenoid includes a delay mechanism to ensure the holding of the movable cam section in operative position until the roller 284 has reached the stationary cam track. The actuators are located at different distances from the stationary ring 306 at each delivery station so as to be responsive to different settings of the pins.

While we have described herein some embodiments of our invention, we wish it to be understood that we do not intend to be limited thereby except within the scope of the claims hereto or hereinafter appended.

We claim:

1. In a machine for sorting thin articles having a transporting member movable along a path, means along said path holding a plurality of trays at at least one induction station and a plurality of delivery stations, each tray having an opening in its front wall facing the path, means at the induction station to move the transporting member transversely of the path into such opening to engage an article in the tray at the induction station, means at the induction station operatively engageable with the transporting member to render it operative to grip an article in such tray, means selectively settable to move the transporting member at a delivery station transversely of the path into such opening to insert an article in the tray at such station, and means at such station operatively engageable with a transversely moved transporting member to render it inoperative so as to leave an article carried thereby in the tray at such delivery station.

2. In a machine as claimed in claim 1, means carried by said transporting member to engage articles in the tray in advance of the article carried by the member to push the articles in the tray away from the opening, said transporting member engaging means at the induction station being rendered operative after said article pushing means has released the articles at such station.

3. In a machine as claimed in claim 2, said article pushing means comprising rollers turnable about an axis transverse to the path.

4. In a machine as claimed in claim 2, means to maintain a substantially constant pressure on articles in the tray at the induction station.

5. In a machine as claimed in claim 1, said tray having top and bottom and side walls and a front wall, the height of said front wall being less than the height of the tray so as to provide said opening, a plate inside the tray vertically arranged and movable longitudinally thereof, a pulley carried at each corner of the plate, a plurality of cables, and a spring bar adjacent the rear of the tray at each side thereof and extending into the corner, each cable being connected to an end of one of said spring bars, running beneath a pulley at the corner of the plate in the same corner as the end of the spring bar, and then diagonally across the back of the plate, over the pulley at the diagonally opposite corner, and having its other end connected to the tray adjacent the front wall thereof.

6. In a machine as claimed in claim 5, means to maintain a substantially constant pressure on articles in the tray at the induction station.

7. A machine for sorting thin articles comprising a frame mounted for a rotation about a vertical axis, a stationary support at least partly surrounding said frame, said support having means extending peripherally of the frame for holding a plurality of containers for the articles at the same level, pickup means mounted on said frame, control means associated with said pickup means, means to set said control means in accordance with preselection of one of said container holding means, a plurality of means one associated with each of at least some of said container holding means responsive to a particular setting of said control means to move said pickup means outwardly, means adjacent each such container holding means operatively engageable with an outwardly moved pickup means to render the pickup means inoperative so as to deposit an article carried thereby in a container held by such container holding means, at least one of said container holding means constituting an induction station, means adjacent said induction station to move said pickup means outwardly, means adjacent said induction station operatively engageable with an outwardly moved pickup means to render the pickup means operative to pick up an article from a container at said induction station.

8. A machine for sorting thin articles comprising a frame mounted for a rotation about a vertical axis, a stationary support at least partly surrounding said frame, said support having means extending peripherally of the frame for holding a plurality of containers for the articles at the same level, pickup means mounted on said frame for movement towards and away from the shaft axis, control means associated with said pickup means, means to set said control means in accordance with a preselection of one of said container holding means, a plurality of means one associated with each of at least some of said container holding means responsive to a particular setting of said control means to move said pickup means outwardly, means adjacent each such container holding means operatively engageable with an outwardly moved pickup means to render the pickup means inoperative so as to deposit an article carried thereby in a container held by such container holding means, at least one of said container holding means constituting an induction station, means adjacent said induction station to move said pickup means outwardly, and means adjacent said induction station operatively engageable with said outwardly moved pickup means to render the pickup means operative to pick up an article from a container at said induction station.

9. In a machine for sorting thin articles comprising a substantially circular carrier, means mounting said carrier for rotation about a vertical axis, means to rotate the carrier in one direction, a stationary framework surrounding the carrier at stations spaced around the framework, at least one station constituting an induction station, means to transfer articles from the induction station comprising a suction mechanism including a pipe section mounted on the carrier for movement between radially spaced inner and outer positions, means resiliently urging said pipe section towards the inner of said positions, a suction head carried at one end of the pipe section, said suction head having an open front end which, in the outer position of the pipe section, lies closely adjacent the innermost of a group of articles carried at the induction station, cam means carried by said framework adjacent the induction station engageable with the section mechanism passing the induction station to draw the pipe section and suction head to their outer position, said suction head having at least one opening to atmosphere, valve means operatively associated with said suction head movable between two positions in a first of which it closes the opening to atmosphere and establishes communication between said pipe section and the interior of the head and in the second of which it opens the opening to atmosphere and closes off the pipe section, cam mechanism carried by said framework adjacent the induction station engageable with said valve means to move the valve means from the second position to the first whereby to engage suctionally an article held in the induction station, and a source of suction mounted on the carrier and rotatable therewith connected to said pipe section.

10. In a machine as claimed in claim 9, in which said article transferring means moves in a closed path, means in advance of said induction station engageable with the suction mechanism to release therefrom an article carried thereby.

11. A machine for sorting thin articles comprising a substantially circular carrier, means mounting said carrier for rotation about a vertical axis, means to rotate the carrier in one direction, a stationary framework surrounding the carrier, stations spaced around said framework, at least one station constituting an induction station, and a majority of the stations constituting receiving stations, means to transfer articles from the induction station to a receiving station comprising a part mounted on the carrier for movement between radially spaced inner and outer positions, means resiliently urging said part towards the inner of said positions, a gripping member carried at the outer end of the part, said gripping member in the outer position of the part lying closely adjacent the innermost of a group of articles at the induction station, means carried by said framework adjacent the induction station engageable with a part passing the induction station to draw the part and the gripping mechanism to their outer position, control means operatively associated with said gripping member movable between two positions in a first of which it renders the gripping member operative and in the second of which it renders the gripping member inoperative, mechanism carried by said framework adjacent the induction station engageable with said control means to move the control means from the second position to the first whereby to engage an article held at the induction station, means at each receiving station movable between an operative position in which it engages a part to move it outwardly and an inoperative position, selectable means adjacent each receiving station carried by the framework operatively connected with the part moving means at such station for moving it to operative position, and mechanism at each receiving station operatively engageable with the control means of a gripping member which occupies an outer position to move the control means from the first to the second position, whereby to release an article carried by the gripping member.

12. A machine as claimed in claim 11, in which said part moves in a closed path, a residue station in advance of said induction station, means at said residue station engageable with said part to draw the part and the gripping member to their outer position, and mechanism carried by the framework adjacent the residue station engageable with said control means to move the control means from the first position to the second, whereby to deposit articles at the residue station.

13. In a machine for sorting thin articles comprising a substantially circular carrier, means mounting said carrier for rotation about a vertical axis, means to rotate the carrier in one direction, said carrier including an annular ring adjacent the periphery thereof, a stationary framework surrounding the carrier and including an annular ring member at the level of the ring of said carrier, holding means for trays at station spaced around said ring member and carried thereby, at least one station constituting an induction station, and a majority of the stations constituting receiving stations, trays held by the holding means in the induction and receiving stations, means to transfer articles from a tray at the induction station to a tray at a preselected receiving station comprising a part mounted on the annular ring for movement between radially spaced inner and outer positions, means resiliently urging said part towards the inner of said positions, a gripping member carried at the outer end of the part, said gripping member in the outer position of the part lying closely adjacent the innermost of a group of articles carried in the induction tray, means carried by said framework adjacent the induction station engageable with a part passing the induction station to draw the part and the gripping member to their outer position, control means operatively associated with said gripping member movable between two positions in a first of which it renders the gripping member operative and in the second of which it renders the gripping member inoperative, mechanism carried by said framework adjacent the induction station engageable with said control means to move the control means from the second position to the first whereby to engage an article held in the induction tray, means at each receiving station selectively movable between an operative position in which it engages a part to move it outwardly and an inoperative position, selectable means adjacent each receiving station carried by the framework connected with the part moving means at such station for moving it to operative position, mechanism at each receiving station operatively engageable with the control means of a gripping member which occupies an outer position to move the control means from the first to the second position, whereby to release an article carried by the gripping member, the tray at each receiving station having an opening thereinto to receive articles from a gripping member which is in its outer position.

14. A machine for sorting thin articles comprising a substantially circular carrier, means mounting said carrier for rotation about a vertical axis, means to rotate the carrier in one direction, said carrier including an annular ring adjacent the periphery thereof, a stationary framework surrounding the carrier and including an annular ring member at the level of the ring of said carrier, holding means for trays at stations spaced around said ring member and carried thereby, at least one station constituting an induction station, and a majority of the stations constituting receiving stations, trays held by the holding means in the induction and receiving stations, means to transfer articles from a tray at the induction station to a tray at a preselected receiving station comprising a suction mechanism including a pipe section mounted on the annular ring for movement between radially spaced inner and outer positions, a suction head carried at the outer end of each pipe section, said suction head having an open front end which, in the outer position of the pipe section, lies closely adjacent the innermost of a group of articles carried in the induction tray, cam means carried by said framework adjacent the induction station engageable with a suction mechanism passing the induction station to draw the pipe section and suction head to their outer position, control means operatively associated with said suction head movable between two positions in a first of which it renders the suction head operative and in the second of which it renders the suction head inoperative, mechanism carried by said framework adjacent the induction station engageable with said control means to move the control means from the second position to the first whereby to engage suctionally an article held in the induction tray, means carried by the framework at each receiving station movable between an operative position in which it engages a suction mechanism to move it outwardly and an inoperative position, selectable means adjacent each receiving station carried by the framework connected with the cam means at such station for moving it to operative position, mechanism at each receiving station operatively engageable with the control means of a suction head which occupies an outer position to move the control means from the first to the second position, whereby to release the suction on an article carried by the suction mechanism, the tray at each receiving station having an opening thereinto to receive articles from a suction mechanism which is in its outer position, and a source of suction connected to said pipe section.

15. A machine for sorting thin articles comprising a substantially circular carrier, means mounting said carrier for rotation about a vertical axis, means to rotate the carrier in one direction, said carrier including an annular ring adjacent the periphery thereof, a stationary framework surrounding the carrier and including an annular ring member at the level of the ring of said carrier, holding means for trays at stations spaced around said ring member and carried thereby, at least one station constituting an induction station, and a majority of the stations constituting receiving stations, trays held by the holding means in the induction and receiving stations, means to transfer articles from a tray at the induction station to a tray at a preselected receiving station, suction mechanism including a pipe section mounted on the annular ring for movement between radially spaced inner and outer positions, a suction head carried at the outer end of each pipe section, said suction head having an open front end which, in the outer position of the pipe section, lies closely adjacent the innermost of a group of articles carried in the induction tray, cam means carried by said framework adjacent the induction station engageable with a suction mechanism passing the induction station to draw the pipe section and suction head to their outer position, valve means operatively associated with said suction head movable between two positions in a first of which it establishes communication between said pipe section and the interior of the head and in the second of which it closes off the pipe section, fixed cam mechanism carried by said framework adjacent the induction station engageable with said valve means to move the valve means from the second position to the first whereby to engage suctionally an article held in the induction tray, cam means at each receiving station movable between an operative position in which it engages a suction mechanism to move it outwardly and an inoperative position, selectable means adjacent each receiving station carried by the framework operatively connected with the cam means at such station for moving it to operative position, cam mechanism at each receiving station operatively engageable with the valve means of a suction head which occupies an outer position to move the same from the first to the second position, whereby to release the suction on an article carried by the suction mechanism, the tray at each receiving station having an opening thereinto to receive articles from a suction mechanism which is in its outer position, means carried by the suction mechanism in advance of the suction head engageable with articles previously deposited in the receiving tray to push such articles radially outwardly to provide space for the incoming article, and a source of suction connected to said pipe section.

16. A machine for sorting thin articles comprising a substantially circular carrier, means mounting said carrier for rotation about a vertical axis, means to rotate the carrier in one direction, said carrier including an annular ring adjacent the periphery thereof, a stationary framework surrounding the carrier and including an annular ring member at the level of the ring of said carrier, holding means for trays at stations spaced around said ring member and carried thereby, at least one station constituting an induction station and at least one station a residue station, and a majority of the stations constituting receiving stations, trays held by the holding means in the induction, residue and receiving stations, the station immediately preceding the induction station in the direction of rotation of the carrier being a residue station, means to transfer articles from a tray at the induction station to a tray at a preselected receiving station comprising a plurality of suction mechanisms angularly spaced around said axis and each including a pipe section mounted on the annular ring for movement between radially spaced inner and outer positions, means resiliently urging said pipe section towards the inner of said positions, a suction head carried at the outer end of each pipe section, said suction head having an open front end which, in the outer position of the pipe section, lies closely adjacent the innermost of a group of articles carried in the induction tray, cam means carried by said framework adjacent the induction station engageable with a suction mechanism passing the induction station to draw the pipe section and suction head to their outer position, valve means operatively associated with said suction head movable between two positions in a first of which it establishes communication between said pipe section and the interior of the head and in the second of which it closes off the pipe section, cam mechanism carried by said framework adjacent the induction station engageable with said valve means to move the valve means from the second position to the first whereby to engage suctionally an article held in the induction tray, cam means at each receiving station movable between an operative position in which it engages a suction mechanism to move it outwardly and an inoperative position, selectable means adjacent each receiving station carried by the framework operatively connected with the cam means at such station for moving it to operative position, cam mechanism at each receiving station operatively engageable with the valve means of a suction head which occupies an outer position to move the same from the first to the second position, whereby to release the suction on an article carried by the suction mechanism, the tray at each receiving station having an opening thereinto to receive articles from a suction mechanism which is in its outer position, means carried by the suction mechanism in advance of the suction head engageable with articles previously deposited in the receiving tray to push such articles radially outwardly to provide space for the incoming article, cam means carried by the framework adjacent the residue station engageable with each suction mechanism to move the same to its outer position, cam mechanism adjacent the residue station operatively engageable with said valve means when in its first position to move the same from the first to the second position, whereby all undistributed articles removed from the immediately succeeding induction tray are deposited in the residue tray, and a source of suction mounted on the carrier and rotatable therewith connected to said pipe sections.

17. A machine for sorting thin articles comprising a substantially circular carrier, means mounting said carrier for rotation about a vertical axis, means to rotate the carrier in one direction, said carrier including an annular ring adjacent the periphery thereof, a stationary framework surrounding the carrier and including an annular ring member at the level of the ring of said carrier, holding means for trays at stations spaced around said ring member and carried thereby, at least one station constituting an induction station, at least one station a residue station, and a majority of the stations constituting receiving stations, trays held by the holding means in the induction, residue and receiving stations, the station immediately preceding the induction station in the direction of rotation of the carrier being a residue station and the station immediately succeeding the induction station being a code reading station, means to transfer pre-coded articles from a tray at the induction station to a tray at a receiving station selected in accordance with the code on the article comprising a plurality of suction mechanisms angularly spaced around said axis and each including a pipe section mounted on the annular ring for movement between radially spaced inner and outer positions, means resiliently urging said pipe section towards the inner of said positions, a suction head carried at the outer end of each pipe section, said suction head having an open front end which, in the outer position of the pipe section, lies closely adjacent the innermost of a group of articles carried in the induction tray, cam means carried by said framework adjacent the induction station engageable with a suction mechanism passing the induction station to draw the pipe section and suction head to their radially outward position, valve means operatively associated with said suction head movable between two positions in a first of which it establishes communication between said pipe section and the interior of the head and in the second of which it closes off the pipe section, fixed cam mechanism carried by said framework adjacent the induction station engageable with said valve means to move the valve means from the second position to the first whereby to engage suctionally an article held in the induction tray, memory means carried by the carrier adjacent each suction mechanism, means at the code reading station carried by the framework to read the code on the article and operatively engageable with the memory means to set the same in accordance with such code, cam means carried by the framework at each receiving station movable between an operative position in which it engages a suction mechanism to move it outwardly and an inoperative position, means adjacent each receiving station carried by the framework operatively controlled by a selected setting of the memory means, different for each receiving station, operatively connected with the cam means at such station for moving it to operative position, cam mechanism at each receiving station operatively engageable with the valve means of a suction head which occupies a radially outward position to move the same from the first to the second position, whereby to release the suction on an article carried by the suction mechanism, the tray at each receiving station having an opening thereinto to receive articles from a suction mechanism which is in its outer position, means carried by the suction mechanism in advance of the suction head engageable with articles previously deposited in the receiving tray to push such articles radially outwardly to provide space for the incoming article, cam means carried by the framework adjacent the residue station engageable with each suction mechanism to move the same to its outer position, cam mechanism adjacent the residue station operatively engageable with said valve means when in its first position to move the same from the first to the second position, whereby all undistributed articles removed from the immediately succeeding induction tray are deposited in the residue tray, and a source of suction mounted on the carrier and rotatable therewith connected to said pipe sections.

18. A machine for sorting thin articles comprising a substantially circular carrier, means mounting said carrier for rotation about a vertical axis, means to rotate the carrier in one direction, said carrier including a plurality of vertically spaced annular rings adjacent the periphery thereof, a stationary framework surrounding the carrier and including a plurality of vertically spaced annular ring members at levels spaced apart substantially the same distances as the rings of said carrier, holding means for trays at stations spaced around each of said ring members and carried thereby, at least one station constituting an induction station, at least one station a code reading station, and a majority of the stations constituting receiving stations, trays held by the holding means in the induction and receiving stations, the station immediately succeeding the induction station in the direction of rotation of the carrier being a code reading station, means to transfer pre-coded articles from a tray at the induction station to a tray at a receiving station selected in accordance with the code on the article comprising a plurality of suction mechanisms angularly spaced around said axis and each including a pipe section mounted on one of the annular rings for movement between radially spaced inner and outer positions, means resiliently urging said pipe section towards the inner of said positions, a suction head carried at the outer end of each pipe section, said suction head having an open front end which, in the outer position of the pipe section, lies closely adjacent the innermost of a group of articles carried in the induction tray, fixed cam means carried by said framework adjacent the induction station engageable with a suction mechanism passing the induction station to draw the pipe section and suction head to their outer position, said suction head having at least one opening to atmosphere, valve means operatively associated with said suction head movable between two positions in a first of which it closes the opening to atmosphere and establishes communication between said pipe section and the interior of the head and in the second of which it opens the opening to atmosphere and closes off the pipe section, fixed cam mechanism carried by said framework adjacent the induction station engageable with said valve means to move the valve means from the second position to the first whereby to engage suctionally an article held in the induction tray, a mechanical memory means carried by the carrier adjacent each suction mechanism, means at the code reading station carried by the framework to read the code on the article and operatively engageable with the mechanical memory means to set the same in accordance with such code, cam means carried by the framework at each receiving station movable between an operative position in which it engages a suction mechanism to move it outwardly and an inoperative position, means adjacent each receiving station carried by the framework including switch means operatively engageable by a selected setting of the mechanical memory means, different for each receiving station, operatively connected with the cam means at such station for moving it to operative position, cam mechanism at each receiving station operatively engageable with the valve means of a suction head which occupies a radially outward position to move the same from the first to the second position, whereby to release the suction on an article carried by the suction mechanism, the tray at each receiving station having an opening thereinto to receive articles from a suction mechanism which is in its radially outward position, means carried by the suction mechanism in advance of the suction head engageable with articles previously deposited in the receiving tray to push such articles radially outwardly to provide space for the incoming article, and a source of suction mounted on the carrier and rotatable therewith connected to said pipe sections.

19. A machine for sorting thin articles comprising a substantially circular carrier, means mounting said carrier for rotation about a vertical axis, means to rotate the carrier in one direction, said carrier including a plurality of vertically spaced annular rings adjacent the periphery thereof, a stationary framework surrounding the carrier and including a plurality of vertically spaced annular ring members at levels spaced apart substantially the same distances as the rings of said carrier, holding means for trays at stations spaced around each of said ring members and carried thereby, at least one station constituting an induction station, at least one station a residue station, and at least one station a code reading station, and a majority of the stations constituting receiving stations, trays held by the holding means in the induction, residue and receiving stations, the station immediately preceding the induction station in the direction of rotation of the carrier being a residue station and the station immediately succeeding the induction station being a code reading station, means to transfer pre-coded articles from a tray at the induction station to a tray at a receiving station selected in accordance with the code on the article comprising a plurality of suction mechanisms angularly spaced around said axis and each including a pipe section mounted on one of the annular rings for movement between radially spaced inner and outer positions, means resiliently urging said pipe section towards the inner of said positions, a suction head carried at the outer end of each pipe section, said suction head having an open front end which, in the outer position of the pipe section, lies closely adjacent the innermost of a group of articles carried in the induction tray, fixed cam means carried by said framework adjacent the induction station engageable with a suction mechanism passing the induction station to draw the pipe section and suction head to their outer position, said suction head having at least one opening to atmosphere, valve means operatively associated with said suction head movable between two positions in a first of which it closes the opening to atmosphere and establishes communication between said pipe section and the interior of the head and in the second of which it opens the opening to atmosphere and closes off the pipe section, fixed cam mechanism carried by said framework adjacent the induction station engageable with said valve means to move the valve means from the second position to the first whereby to engage suctionally an article held in the induction tray, a mechanical memory means carried by the carrier adjacent each suction mechanism, means at the code reading station carried by the framework to read the code on the article and operatively engageable with the mechanical memory means to set the same in accordance with such code, cam means carried by the framework at each receiving station movable between an operative position in which it engages a suction mechanism to move it outwardly and an inoperative position, means adjacent each receiving station carried by the framework including switch means operatively engageable by a selected setting of the mechanical memory means, different for each receiving station, operatively connected with the cam means at such station for moving it to operative position, cam mechanism at each receiving station operatively engageable with the valve means of a suction head which occupies a radially outward position to move the valve means from the first to the second position, whereby to release the suction on an article carried by the suction mechanism, the tray at each receiving station having an opening thereinto to receive articles from a suction mechanism which is in its radially outward position, means carried by the suction mechanism in advance of the suction head engageable with articles previously deposited in the receiving tray to push such articles radially outwardly to provide space for the incoming article, fixed cam means carried by the framework adjacent the residue station engageable with each suction mechanism to move the same to its outer position, cam mechanism adjacent the residue station operatively engageable with said valve means when in its first position to move the same from the first to the second position, whereby all undistributed articles removed from the induction tray are deposited in the residue tray, and a source of suction mounted on the carrier and rotatable therewith connected to said pipe sections.

20. A machine for sorting thin articles comprising a substantially circular carrier, means mounting said carrier for rotation about a vertical axis, means to rotate the carrier in one direction, said carrier including a plurality of vertically spaced annular rings adjacent the periphery thereof, a stationary framework surrounding the carrier and including a plurality of vertically spaced annular ring members at levels spaced apart substantially the same distances as the rings of said carrier, holding means for trays at stations spaced around each of said ring members and carried thereby, at least one station constituting an induction station, at least one station a residue station, and at least one station a code reading station, and a majority of the stations constituting receiving stations, trays held by the holding means in the induction, residue and receiving stations, the station immediately preceding the induction station in the direction of rotation of the carrier being a residue station and the station immediately succeeding the induction station being a code reading station, means to transfer pre-coded articles from a tray at the induction station to a tray at a receiving station selected in accordance with the code on the article comprising a plurality of suction mechanisms angularly spaced around said axis and each including a pipe section mounted on one of the annular rings for movement between radially spaced inner and outer positions, means resiliently urging said pipe section towards the inner of said positions, a suction head carried at the outer end of each pipe section, said suction head having an open front end which, in the outer position of the pipe section, lies closely adjacent the innermost of a group of articles carried in the induction tray, fixed cam means carried by said framework adjacent the induction station engageable with a suction mechanism passing the induction station to draw the pipe section and suction head to their outer position, said suction head having at least one opening to atmosphere, valve means operatively associated with said suction head movable between two positions in a first of which it closes the opening to atmosphere and establishes communication between said pipe section and the interior of the head and in the second of which it opens the opening to atmosphere and closes off the pipe section, fixed cam mechanism carried by said framework adjacent the induction station engageable with said valve means to move the valve means from the second position to the first whereby to engage suctionally an article held in the induction tray, a mechanical memory means carried by the carrier adjacent each suction mechanism, means at the code reading station carried by the framework to read the code on the article and operatively engageable with the mechanical memory means to set the same in accordance with such code, cam means carried by the framework at each receiving station movable between an operative position in which it engages a suction mechanism to move it outwardly and an inoperative position, means adjacent each receiving station carried by the framework including switch means operatively engageable by a selected setting of the mechanical memory means, different for each receiving station, operatively connected with the cam means at such station for moving it to operative position, cam mechanism at each receiving station operatively engageable with the valve means of a suction head which occupies a radially outward position to move the valve means from the first to the second position, whereby to release the suction on an article carried by the suction mechanism, the tray at each receiving station having an opening thereinto to receive articles from a suction mechanism which is in its radially outward position, means carried by the suction mechanism in advance of the suction head engageable with articles previously deposited in the receiving tray to push such articles radially outwardly to provide space for the incoming article, fixed cam means carried by the framework adjacent the residue station engageable with each suction mechanism to move the same to its outer position, cam mechanism adjacent the residue station operatively engageable with said valve means when in its first position to move the same from the first to the second position, whereby all undistributed articles removed from the induction tray are deposited in the residue tray, and a source of suction mounted on the carrier and rotatable therewith connected to said pipe sections.

21. A machine as claimed in claim 20, in which said article transferring means moves in a closed path, and clearing means in advance of said induction station for clearing said memory means.

22. In a machine for sorting articles having a transporting member, means to move said member along a path, and a plurality of delivery stations along said path, selectively operable means at each delivery station engageable with the transporting member to render the transporting member inoperative so as to deposit an article carried thereby at the delivery station, comprising a block associated with the transporting member having a plurality of bores therein spaced transversely of the path, a pin in each of said bores, means in said block engaging said pins to hold the pins releasably in either of two positions having projections of differing amounts on opposite sides of the block, pin setting mechanism comprising a plurality of levers spaced across said path one in the path of each of said pins when projecting the maximum distance from a first side of the block, resilient means urging said levers into the path of the pins, said resilient means exerting less force than is necessary to move the pins in the block, selectively operable means for positively blocking at least one of the levers in pin engaging position, whereby, as the block moves thereby, at least one of the pins is caused to move in the block and to project the maximum distance on the other side of the block, switch means including at least one switch associated with each delivery station having an actuating member engageable by a pin projecting such maximum distance from such other side of the block, said switch means being operatively connected to said transporting member to render the transporting member inoperative when the switch means is closed, the switch means at different delivery stations being responsive to different settings of said pins, whereby the article is delivered at a delivery station preselected by said selectively operable blocking means.

23. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, selectively operable means at each delivery station engageable with said transporting member to draw the transporting member transversely of the path towards the delivery station, means operatively engageable with the transporting member when in such drawn position to render the transporting member inoperative so as to deposit an article carried thereby at the delivery station, a block associated with the transporting member having a plurality of bores therein spaced transversely of the path, a pin in each of said bores, means in said block engaging said pins to hold the pins releasably in either of two positions having projections of differing amounts on opposite sides of the block, pin setting mechanism selectively operable to engage at least one of the pins, whereby, as the block moves thereby, at least one of the pins is caused to move in the block and to project the maximum distance on the other side of the block, switch means including at least one switch associated with each delivery station having an actuating member engageable by a pin projecting such maximum distance from such other side of the block, and means operatively connected to said transporting member engaging means to render the same operative when the switch is closed, the switch means at different delivery stations being responsive to different settings of said pins, whereby the article is delivered at a delivery station preselected by said selectively operable pin setting mechanism.

24. In a machine as claimed in claim 22, in which said transporting member moves in a closed path, and means in advance of said levers engageable with any pins projecting a maximum distance from said other side of the block to move said pins through the block to project a maximum distance from said first side thereof.

25. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, selectively operable means at each delivery station engageable with said transporting member to draw the transporting member transversely of the path towards the delivery station, means operatively engageable with the transporting member when in such drawn position to render the transporting member inoperative so as to deposit an article carried thereby at the delivery station, a block associated with the transporting member having a plurality of bores therein spaced transversely of the path, a pin in each of said bores, means in said block engaging said pins to hold the pins releasably in either of two positions having projections of differing amounts on opposite sides of the block, pin setting mechanism comprising a plurality of levers spaced across said path one in the path of each of said pins when projecting the maximum distance from a first side of the block, resilient means urging said levers into the path of the pins, said resilient means exerting less force than is necessary to move the pins in the block, selectively operable means for positively blocking at least one of the levers in pin engaging position, whereby, as the block moves thereby, at least one of the pins is caused to move in the block and to project a maximum distance on the other side of the block, switch means including at least one switch associated with each delivery station having an actuating member engageable by a pin projecting such maximum distance from such other side of the block, and a solenoid operatively connected to said transporting member engaging means, said switch being operatively connected to said solenoid to energize said solenoid to render the transporting member engaging means operative when the switch is closed, the switch means at different delivery stations being responsive to different settings of said pins, whereby the article is delivered at a delivery station preselected by said selectively operable blocking means.

26. In a machine for sorting articles having a transporting member, means to move said member along a path, and a delivery station along said path, said transporting member being movable transversely of the path towards and away from the delivery station, a cam track at the delivery station having a stationary part and a coacting movable part in advance of the stationary part mounted to move in operative and inoperative positions, said movable part in operative position forming a continuation of said stationary part, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, and means to move the movable cam track part between operative and inoperative positions.

27. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, a cam track at each delivery station having a stationary part and a coacting movable part in advance of the stationary part mounted to turn about a horizontal axis generally parallel to such path between operative and inoperative positions, said movable part in operative position forming a continuation of said stationary part, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, and means to move said movable cam track part between operative and inoperative positions.

28. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, a cam track at each delivery station having a stationary part and a coacting movable part in advance of the stationary part mounted to turn about a vertical axis between operative and inoperative positions, said movable part in operative position forming a continuation of said stationary part, spring means operatively connected to said movable part normally urging it towards inoperative position, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, and means to move said movable part to operative position, whereby the article is delivered at a delivery station at which the movable cam track part is moved to operative position by said moving means.

29. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, a cam track at each delivery station having a stationary part and a coacting movable part in advance of the stationary part mounted to turn about a vertical axis between operative and inoperative positions, said movable part in operative position forming a continuation of said stationary part, spring means operatively connected to said movable part normally urging it towards inoperative position, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, selectively operable means carried by said transporting member, means at each delivery station engageable by said selectively operable means to move the movable part to operative position, said moving means at different delivery stations being responsive to different settings of said selectively operable means whereby the article is delivered at a delivery station preselected by said selectively operable means.

30. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, a cam track at each delivery station having a stationary part and a coacting movable part in advance of the stationary part mounted to turn about a vertical axis between operative and inoperative positions, said movable part in operative position forming a continuation of said stationary part, spring means operatively connected to said movable part normally urging it towards inoperative position, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, selectively operable means carried by said transporting member, switch means including at least one switch associated with each delivery station having an actuating member engageable by said selectively operable means, and a solenoid operatively connected to said movable part, said switch being operatively connected to said solenoid to energize the same to move said movable part to operative position when the switch is closed, the switch means at different delivery stations being responsive to different settings of said selectively operable means, whereby the article is delivered at a delivery station preselected by said selectively operable means.

31. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, a cam track at each delivery station having a stationary part and a coacting movable part in advance of the stationary part mounted to turn about a vertical axis between operative and inoperative positions, said movable part in operative position forming a continuation of said stationary part, spring means operatively connected to said movable part normally urging it towards inoperative position, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, a block associated with the transporting member having a plurality of bores therein spaced transversely of the path, a pin in each of said bores, means in said block engaging said pins to hold the pins releasably in either of two positions having projections of differing amounts on opposite sides of the block, pin setting mechanism selectively operable to engage at least one of the pins, whereby, as the block moves thereby, at least one of the pins is caused to move in the block and to project its maximum distance on the other side of the block, switch means including at least one switch associated with each delivery station having an actuating member engageable by a pin projecting such maximum distance from such other side of the block, and a solenoid operatively connected to said movable part, said switch being operatively connected to said solenoid to energize the same to move the movable part to operative position when the switch is closed, the switch means at different delivery stations being responsive to different settings of said pins, whereby the article is delivered at a delivery station preselected by said selectively operable pin setting mechanism.

32. In a machine for sorting articles having a transporting member, means to move said member along a path, and an induction station and a plurality of delivery stations along said path, said transporting member being movable transversely of the path towards and away from the induction and delivery stations, means adjacent the induction station operatively engageable with the transporting member to move it towards the induction station and to render it operative to engage and hold an article at such station, a cam track at each delivery station having a stationary part and a coacting movable part in advance of the stationary part mounted to turn about a vertical axis between operative and inoperative positions, said movable part in operative position forming a continuation of said stationary part, spring means operatively connected to said movable part normally urging it towards inoperative position, said transporting member having means thereon engageable with the movable part when in its operative position to draw the transporting member transversely of the path towards the delivery station, means operatively engageable with the transporting member when in such drawn position to render the transporting member inoperative so as to deposit an article carried thereby at the delivery station, a block associated with the transporting member having a plurality of bores therein spaced transversely of the path, a pin in each of said bores, means in said block engaging said pins to hold the pins releasably in either of two positions having projections of differing amounts on opposite sides of the block, pin setting mechanism comprising a plurality of levers spaced across said path one in the path of each of said pins when projecting the maximum distance from a first side of the block, resilient means urging said levers into the path of the pins, said resilient means exerting less force than is necessary to move the pins in the block, selectively operable means for positively blocking at least one of the levers in pin engaging position, whereby, as the block moves thereby, at least one of the pins is caused to move in the block and to project its maximum distance on the other side of the block, switch means including at least one switch associated with each delivery station having an actuating member engageable by a pin projecting such maximum distance from such other side of the block, and a solenoid operatively connected to said movable part, said switch being operatively connected to said solenoid to energize the same to move the movable part to operative position when the switch is closed, the switch means at different delivery stations being responsive to different settings of said pins, whereby the article is delivered at a delivery station preselected by said selectively operable means.

33. In a machine for sorting thin articles a suction device for picking up and releasing articles comprising a suction pipe, a suction head carried by said pipe at one end thereof of greater internal diameter than the end of the pipe, said head having a cylindrical closed side wall and at least one opening in each end wall, a disc within the head of a diameter intermediate the inside diameters of the pipe and the head, a ring on the outside of the rear end wall of the head surrounding the pipe and adapted to overlie the opening in such rear end wall, and means rigidly connecting the disc and ring, the length of said connecting means being somewhat greater than the distance between the end of the pipe and the outer face of the rear end wall of said head.

34. In a machine for sorting thin articles a suction device for picking up and releasing articles comprising a suction pipe, a suction head carried by said pipe at one end thereof of greater internal diameter than the end of the pipe, said head having a cylindrical closed side wall and at least one opening in each end wall, a disc within the head of a diameter intermediate the inside diameters of the pipe and the head, a ring on the outside of the rear end wall of the head surrounding the pipe and adapted to overlie the opening in such rear end wall, means rigidly connecting the disc and ring, the length of said connecting means being somewhat greater than the distance between the end of the pipe and the outer face of the rear end wall of said head, levers pivoted on the outside of the head about an axis spaced laterally from the pipe axis, and a loose connection between said levers and said ring to permit the ring to rock with respect to the levers.

35. In a machine for sorting thin articles a suction device for picking up and releasing articles comprising a suction pipe, a suction head carried by said pipe at one end thereof of greater internal diameter than the end of the pipe, said head having a cylindrical closed side wall and at least one opening in each end wall, a disc within the head of a diameter intermediate the inside diameters of the pipe and the head, a ring on the outside of the rear end wall of the head surrounding the pipe and adapted to overlie the opening in such rear end wall, and means rigidly connecting the disc and ring.

36. In a machine as claimed in claim 9, said suction head being of greater internal diameter than the end of the pipe section, said suction head having a cylindrical closed side wall and at least one opening in each end wall, said valve means including a disc within the suction head of a diameter intermediate the inside diameters of the pipe section and the suction head, a ring on the outside of the rear end wall of the suction head surrounding the pipe section and adapted to overlie the opening in such rear end wall, and means rigidly connecting the disc and ring, the length of said connecting means being somewhat greater than the distance between the end of the pipe section and the outer face of the rear end wall of said suction head.

37. In a machine as claimed in claim 9, said suction head being of greater internal diameter than the end of the pipe section, said suction head having a cylindrical closed side wall and at least one opening in each end wall, said valve means including a disc within the suction head of a diameter intermediate the inside diameters of the pipe section and the suction head, a ring on the outside of the rear end wall of the suction head surrounding the pipe section and adapted to overlie the opening in such rear end wall, and means rigidly connecting the disc and ring, the length of said connecting means being somewhat greater than the distance between the end of the pipe section and the outer face of the rear end wall of said suction head, levers pivoted on the outside of the suction head about an axis spaced laterally from the pipe section axis, a loose connection between said levers and said ring to permit the ring to rock with respect to the levers, and lever actuating means carried by one of the levers engageable with said cam mechanism.

38. A machine as claimed in claim 11, means carried by said part engageable with said part moving means to return the same to inoperative position as the part passes the induction station.

39. In a machine for sorting thin articles a tray for feeding thin articles to or receiving thin articles from a transporting head travelling thereby, comprising top and bottom and side walls and a front wall, the height of said front wall being less than the height of the tray so as to provide a space for engagement of articles within the tray by the transporting head, a plate inside the tray vertically arranged and movable longitudinally thereof, a pulley carried at each corner of the plate, a plurality of cables, a spring bar adjacent the rear of the tray at each side thereof and extending into the corner thereof, each cable being connected at one end to an end of one of said spring bars, running beneath a pulley at the corner of the plate in the same corner as the end of the spring bar, and then diagonally across the back of the plate, over the pulley at the diagonally opposite corner, and having its other end connected to the tray adjacent the front wall thereof, a motor, means operatively connecting said motor to said plate to impart a force thereagainst in the direction toward the front of the tray, and control means for said motor responsive to the pressure of articles in the tray to maintain a substantially constant pressure on such articles.

40. In a machine for sorting thin articles a tray for feeding thin articles to or receiving thin articles from a transporting head travelling thereby, comprising top and bottom and side walls and a front wall, the height of said front wall being less than the height of the tray so as to provide a space for engagement of articles within the tray by the transporting head, a plate inside the tray vertically arranged and movable longitudinally thereof, a pulley carried at each corner of the plate, a plurality of cables, and a spring bar adjacent the rear of the tray at each side thereof and extending into the corners, each cable being connected to an end of one of said spring bars, running beneath a pulley at the corner of the plate in the same corner as the end of the spring bar, and then diagonally across the back of the plate, over the pulley at the diagonally opposite corner, and having its other end connected to the tray adjacent the front wall thereof.

41. In a machine for sorting thin articles a tray for feeding thin articles to or receiving thin articles from a transporting head travelling thereby, comprising top and bottom and side walls and a front wall, the height of said front wall being less than the height of the tray so as to provide a space for engagement of articles within the tray by the transporting head, said tray having a slot running longitudinally of the top wall, a plate inside the tray vertically arranged and movable longitudinally thereof, means operatively connected to the tray and the plate to guide the movement of the plate, a member carried by said tray and having a projection thereon through the slot in the top of the tray, locking means carried by said member and engageable with the tray to lock the member against movement, spring means urging said locking means towards locking position, a lever carried by said member having an actuating portion extending upwardly through the slot in the tray top, a motor, means operatively connecting said motor to said lever actuating portion to impart a force thereagainst in the direction toward the front of the tray, a switch connected in the circuit of said motor, and means engageable with said switch and responsive to the pressure of articles in the tray to open the switch when the pressure on said articles exceeds a predetermined amount, whereby to maintain a substantially constant pressure on the articles in the tray.

42. In a machine for sorting thin articles a tray for feeding thin articles to or receiving thin articles from a transportation head travelling thereby, comprising top and bottom and side walls and a front wall, the height of said front wall being less than the height of the tray so as to provide a space for engagement of articles within the tray by said transportation head, a plate inside the tray vertically arranged and movable longitudinally thereof, means operatively connected to the tray and the plate to guide the plate in its movement, a member carried by said tray, locking means carried by said member and engageable with the tray to lock the member against movement, spring means urging said locking means towards locking position, a lever carried by said member having a portion against the locking means and having an actuating portion, a motor, means operatively connecting said motor to said lever actuating portion to impart a force thereagainst in the direction towards the front of the tray, a switch connected in the circuit of said motor, and means engageable with said switch and responsive to the pressure of articles in the tray to open the switch when the pressure on said articles exceeds a predetermnied amount, whereby to maintain a substantially constant pressure on the articles in the tray.

43. In a machine for sorting thin articles a tray for feeding this articles to or receiving thin articles from a transporting head travelling thereby, comprising top and bottom and side walls and a front wall, the height of said front wall being less than the height of the tray so as to provide a space for engagement of articles within the tray by the transporting head, said tray having a slot running longitudinally of the top wall, a plate inside the tray vertically arranged and movable longitudinally thereof, means operatively connected to the tray and the plate to guide the plate in its movement, a member carried by said tray and having a projection thereon through the slot in the top of the tray, a pin slidably vertically mounted in said member and engageable with the top of the tray to lock the member against movement, spring means pushing said pin towards locking position, a lever carried by said member having a portion engaging the pin and having an actuating portion extending upwardly through the slot in the tray top, a motor, means operatively connecting said motor to said lever actuating portion to impart a force thereagainst in the direction towards the front of the tray, a switch connected in the circuit of said motor, and means engageable with said switch and responsive to the pressure of articles in the tray to open the switch when the pressure on said articles exceeds a predetermined amount, whereby to maintain a substantially constant pressure on the articles in the tray.

44. In a machine for sorting thin articles a tray for feeding thin articles to or receiving thin articles from a transporting head travelling thereby, comprising top and bottom and side walls and a front wall, the height of said front wall being less than the height of the tray so as to provide a space for engagement of articles within the tray by the transporting head, said space being located adjacent the bottom of the tray, said tray having a slot running longitudinally of the top wall, a plate inside the tray vertically arranged and movable longitudinally thereof, means operatively connected to the tray and the plate to guide the plate in its movement, a member carried by said plate and having projection thereon through the slot in the top of the tray, a pin slidably vertically mounted in said member and engageable with the top of the tray to lock the member against movement, spring means pushing said pin towards locking position, a lever carried by said member having a portion engaging the pin and having an actuating portion extending upwardly through the slot in the tray top, a motor, means operatively connecting said motor to said lever actuating portion to impart a force thereagainst in the direction towards the front of the tray, a second lever pivoted on the tray adjacent the front wall thereof and having a portion extending into the tray underneath the lower edge of the front wall to engage articles within the tray and a switch connected in the circuit of said motor, said second lever having a portion engageable with said switch to open the same when the pressure on said inwardly extending portion of the second lever exceeds a predetermined amount, whereby to maintain a substantially constant pressure on the articles in the tray.

45. In a machine for sorting thin articles a tray for feeding thin articles to or receiving thin articles from a transporting head travelling thereby, comprising top and bottom and side walls and a front wall, the height of said front wall being less than the height of the tray so as to provide a space for engagement of articles within the tray by the transporting head, said tray having a slot running longitudinally of the top wall, a plate inside the tray vertically arranged and movable longitudinally thereof, a pulley carried at each corner of the plate, a plurality of cables, a spring bar adjacent the rear of the tray at each side thereof and extending into the corner thereof, each cable being connected at one end to an end of one of said spring bars, running beneath a pulley at the corner of the plate in the same corner as the end of the spring bar, and then diagonally across the back of the plate, over the pulley at the diagonally opposite corner, and having its other end connected to the tray adjacent the front wall thereof, a member carried by said plate and having a projection thereon through the slot in the top of the tray, a pin slidably vertically mounted in said member and engageable with the top of the tray to lock the member against movement, spring means pushing said pin towards locking position, a lever carried by said member having a portion engaging the pin and having an actuating portion extending upwardly through the slot in the tray, a motor, means operatively connecting said motor to said lever actuating portion to impart a force thereagainst in the direction towards the front of the tray, a switch connected in the circuit of said motor, and means engageable with said switch and responsive to the pressure of the articles in the tray to open the switch when the pressure of the articles exceeds a predetermined amount, whereby to maintain a substantially constant pressure on the articles in the tray.

46. In a machine for sorting letters, a letter-holding box adapted to contain letters and a recipient box spaced from the letter-holding box and adapted to receive letters from the holding box, at least one letter transferring head movable relative to said boxes from the letter-holding box to the recipient box, said head having a suction opening, a source of suction adapted to be communicated to the transferring head, a valve connected with the head and adapted in a first position to apply the suction and in a second position to shut off the suction, from the head, means operable to move said valve to the first position and to the second position, said valve-operating means comprising a first cam operable to move the valve to the first position when the suction opening is at the letter-holding box and maintaining the suction until the head arrives at the recipient box, a second cam operable to move the valve to the second position when the head carrying the letter is at the recipient box, and means pushing the letter in the recipient box before the valve is moved to the second position.

47. In a machine for sorting letters, a letter-holding box adapted to contain letters and a receiving box spaced from the letter-holding box and adapted to receive from the holding box letters bearing a code which corresponds with the receiving box, means holding said boxes, a letter transferring head movable relative to said means and said boxes, from the holding box to the receiving box, said head having a suction opening, a source of suction adapted to be communicated to the head, a valve connected with the head and adapted in a first position to apply the suction and in a second position to shut off the suction to the head, means operable to move said valve to the first position and to the second position, said valve operating means comprising a first cam attached to the box-holding means and operable to move the valve to its first position when the suction opening is at the letter-holding box and maintaining the suction until the head arrives at the receiving box, and a second cam attached to the box-holding means operable to move the valve to its second position when the head carrying the letter is at the receiving box, a code reading means located along the path of travel of the head from the holding box to the receiving box, a movable cam means related to the receiving box and movable into an operating position by actuation of the code-reading means, when it reads said code, said movable cam means, when in its operating position, moving the head into the receiving box when the head arrives at the receiving box, whereby when the head carrying the coded letter is at the receiving box, the movable cam means urges the head toward the receiving box, and means pushing the letter into the receiving box before the valve is moved to the second position.

48. In a machine for sorting thin articles having a transporting member movable along a path, means along said path holding a plurality of trays at delivery stations, each tray having an opening in its front wall facing the path, means selectively settable to move the transporting member at a delivery station transversely of the path into such opening to insert an article in the tray at such station, and means at such station operatively engageable with a transversely moved transporting member to render it inoperative so as to leave an article carried thereby in the tray at such delivery station, and means carried by said transporting member to engage articles in the tray in advance of the article carried by the transporting member to push the articles in the tray away from the opening, said article pushing means comprising rollers turnable about an axis transverse to the path.

49. In a machine for sorting thin articles having a transporting member movable along a path, means along said path holding a plurality of trays at delivery stations, each tray having an opening in its front wall facing the path, means selectively settable to move the transporting member at a delivery station transversely of the path into such opening to insert an article in the tray at such station, and means at such station operatively engageable with a transversely moved transporting member to render it inoperative so as to leave an article carried thereby in the tray at such delivery station, said tray having top and botton and side walls and a front wall, the height of said front wall being less than the height of the tray so as to provide said opening, a plate inside the tray vertically arranged and movable longitudinally thereof, a pulley carried at each corner of the plate, a plurality of cables, and a spring bar adjacent the rear of the tray at each side thereof and extending into the corner, each cable being connected to an end of one of said spring bars, running beneath a pulley at the corner of the plate in the same corner as the end of the spring bar, and then diagonally across the back of the plate, over the pulley at the diagonally opposite corner, and having its other end connected to the tray adjacent the front wall thereof.

50. In a machine for sorting thin articles having a transporting member movable along a path, means along said path holding a plurality of trays at delivery stations, each tray having an opening in its front wall facing the path, means selectively settable to move the transporting member at a delivery station transversely of the path into such opening to insert an article in the tray at such station, and means at such station operatively engageable with a transversely moved transporting member to render it inoperative so as to leave an article carried thereby in the tray at such delivery station, said transporting member comprising a suction device having a suction pipe, a suction head carried by said pipe at one end thereof of greater internal diameter than and partially overlapping the end of the pipe, said head having a cylindrical closed side wall and at least one opening in each end wall, a disc within the head of the diameter intermediate the inside diameters of the pipe and the head, a ring on the outside of the rear end wall of the head surrounding the pipe and adapted to overlie the opening in such rear end wall, and means rigidly connecting the disc and ring, the length of said connecting means being somewhat greater than the distance between the end of the pipe and the outer face of the rear end wall of said head.

References Cited in the file of this patent
UNITED STATES PATENTS

| | | |
|---|---|---|
| 1,396,221 | Ladd | Nov. 8, 1921 |
| 2,181,995 | Keil | Dec. 5, 1939 |
| 2,310,995 | Robinson | Feb. 16, 1943 |
| 2,382,405 | Eckman | Aug. 14, 1945 |
| 2,795,328 | Tyler | June 11, 1957 |
| 2,904,335 | Rabinow | Sept. 15, 1959 |